US005703023A

United States Patent [19]

Srinivasan

[11] Patent Number: 5,703,023
[45] Date of Patent: Dec. 30, 1997

[54] LUBRICANTS WITH ENHANCED LOW TEMPERATURE PROPERTIES

[75] Inventor: Sanjay Srinivasan, Chesterfield, Mo.

[73] Assignee: Ethyl Corporation, Richmond, Va.

[21] Appl. No.: 561,553

[22] Filed: Nov. 21, 1995

Related U.S. Application Data

[63] Continuation of Ser. No. 161,903, Dec. 3, 1993, abandoned, which is a continuation-in-part of Ser. No. 816,351, Dec. 24, 1991, abandoned.

[51] Int. Cl.$^6$ ............................................. C10M 145/16
[52] U.S. Cl. ................... 508/468; 508/466; 525/327.7; 526/324
[58] Field of Search ................................. 508/466, 468

[56] References Cited

U.S. PATENT DOCUMENTS

| | | | |
|---|---|---|---|
| 2,570,846 | 10/1951 | Otto et al. | 252/56 |
| 2,676,934 | 4/1954 | Butler | 524/549 |
| 2,721,878 | 10/1955 | Popkin | 560/190 |
| 3,115,483 | 12/1963 | Gee et al. | 525/163 |
| 3,184,309 | 5/1965 | Minsk et al. | 96/29 |
| 3,536,461 | 10/1970 | Mueller et al. | 44/62 |
| 3,574,575 | 4/1971 | Gee et al. | 44/62 |
| 3,702,300 | 11/1972 | Coleman | 252/51.5 |
| 3,933,761 | 1/1976 | Coleman | 525/327.6 |
| 3,956,149 | 5/1976 | Coleman | 252/51.5 |
| 3,959,159 | 5/1976 | Coleman | 252/51.5 |
| 4,080,303 | 3/1978 | Frihauf et al. | 252/34.7 |
| 4,192,930 | 3/1980 | Beck et al. | 525/227 |
| 4,284,414 | 8/1981 | Bryant | 44/62 |
| 4,604,221 | 8/1986 | Bryant et al. | 252/51.5 |
| 4,654,050 | 3/1987 | Koch et al. | 44/62 |
| 4,654,403 | 3/1987 | Tipton | 525/194 |
| 4,670,173 | 6/1987 | Hayashi et al. | 252/51.5 |
| 4,734,446 | 3/1988 | Tipton | 524/106 |
| 5,435,928 | 7/1995 | Beck | 508/468 |

FOREIGN PATENT DOCUMENTS

| | | |
|---|---|---|
| 0922878 | 4/1963 | United Kingdom . |
| 1172950 | 12/1969 | United Kingdom . |

OTHER PUBLICATIONS

Smalheer et al., "Lubricant Additives", Section I–pp. 1–11. (1967).

Campen et al., *Hydrocarbon Processing*, 61(2), 1982, pp. 75–82. (No Month).

Gunther, *Lubrication*, Chilton Book Company, PA (1971), pp. 134–137. (No Month).

*Primary Examiner*—Ellen M. McAvoy
*Attorney, Agent, or Firm*—Dennis H. Rainear; Thomas Hamilton

[57] ABSTRACT

Lubricants having a Brookfield viscosity at –40° C. equal to or below 20,000 cP (preferably 15,000 or less) are formed from blends composed of a major amount of mineral oil in the range of about 90N to about 140N; and minor amounts of poly-α-olefin oligomer (PAO) formed from 1-alkene of 6 to 20 carbon atoms and having a kinematic viscosity of about 2 cSt at 100° C.; and vinylaromatic-maleic ester polymeric viscosity index improver. Synergistic low temperature viscometric properties are exhibited by typical compositions of this type.

9 Claims, No Drawings

LUBRICANTS WITH ENHANCED LOW TEMPERATURE PROPERTIES

This is a continuation of U.S. patent application Ser. No. 08/161,903, filed Dec. 3, 1993, now abandoned which is a continuation-in-part application of U.S. Ser. No. 07/816,351, filed Dec. 24, 1991, now abandoned.

Viscosity index improvers (VI improvers) find extensive use in the lubricant industry especially in ATF and crankcase formulation. Design changes in automatic transmissions have resulted in new requirements for automatic transmission fluids. For optimum performance, electronically controlled transmissions require fluids with better low temperature properties. Accordingly, with the advent of DEXRON® IIE specifications in early 1991 and a possible introduction of DEXRON® III specifications for ATFs at the end of 1992, there has been a need and a strong effort to develop automatic transmission fluids with excellent low temperature properties. To satisfy the DEXRON® IIE specifications (and, as it turned out, DEXRON® III specifications as well), a Brookfield viscosity of <20,000 cP at −40° C. is required. To satisfy future specifications, the Brookfield viscosity may have to be <15,000 cP at −40° C.

In many cases, light base stocks (e.g., below 100N) are being used to meet DEXRON® IIE requirements since these base stocks inherently contain less wax. However, this results in increased VI improver treat rates to meet the 100° C. kinematic viscosity required by the MERCON® specifications, namely a kinematic viscosity at 100° C. of at least 6.8 cSt.

An important contribution to the art would be an effective way of enabling use of mineral oil base stocks in the range of about 90N to about 140N in formulations having enhanced low temperature (e.g., −40° C.) properties and reduced requirements for polymeric viscosity index improvers. This invention is believed to constitute such a contribution. Another important contribution would be to fulfill the foregoing objectives while at the same time providing compositions having a kinematic viscosity of at least about 6.8 cSt at 100° C.

In one of its embodiments this invention provides an oleaginous composition which comprises:
 a) a major amount of mineral oil in the range of about 90N to about 140N, e.g., 100N; and minor amounts of
 b) poly-α-olefin oligomer formed by a process comprising oligomerizing at least one 1-alkene having in the range of 6 to 20, preferably 8 to 16, more preferably 10 to 12 and most preferably 10, carbon atoms in the molecule, said oligomer having a kinematic viscosity at 100° C. of about 2 cSt, said oligomer preferably but not necessarily being a hydrogenated oligomer;
 c) vinylaromatic-maleic ester polymeric viscosity index improver; the composition being further characterized by having a Brookfield viscosity at −40° C. equal to or below 20,000 cP, and preferably equal to or below 15,000 cP.

Among the advantages made possible by this invention is the achievement of very good low temperature viscometric properties (e.g., at −40° C.) in mineral oil base stocks having better high temperature viscometric properties than mineral oils of lighter viscosity grades (i.e., below 100N). Further, this invention enables preparation of lubricant and functional fluid compositions having greater shear stability and better thermal and oxidative properties as compared for example to ATFs formulated in lighter naphthenic base stocks.

Moreover, powerful synergistic behavior in low temperature viscometric properties can be—indeed, have been—achieved in at least some of the compositions of this invention. This in turn makes it possible to reduce the amount of the above components b) and/or c) while achieving the synergistic low temperature performance enhancement.

In one preferred embodiment, the polymeric viscosity index improver is a styrene-maleic ester polymer which optionally contains up to about 0.3 weight percent nitrogen, and preferably has a nitrogen content in the range of about 0.05 about 0.3 weight percent.

In another preferred embodiment the polymeric viscosity index improver is a nitrogen-free alternating styrene-maleic ester polymer in which the ester groups comprise at least a major molar proportion of primary alkyl groups having 8, 10, 12, 14, 16 and 18 carbon atoms.

In yet another preferred embodiment the polymeric viscosity index improver is a styrene-maleic ester polymer in which the ester groups comprise at least a major molar proportion of primary alkyl groups falling in the range of $C_8$ to $C_{18}$ alkyl groups, about 50 to about 90 mol % of said primary alkyl groups being linear alkyl groups and the balance of said primary alkyl groups being branched chain alkyl groups.

Pursuant to another preferred embodiment the polymeric viscosity index improver is a vinylaromatic-maleic ester polymer in which at least 90 mol % of the ester groups are primary alkyl groups having 8, 10, 12, 14, 16 and 18 carbon atoms, wherein from 5 to 20 mol % of said primary alkyl groups are linear $C_8$ alkyl groups, and wherein from 10 to 50 mol % of said primary alkyl groups are 2-ethylhexyl groups.

In still another preferred embodiment the polymeric viscosity index improver is an alternating vinylaromatic-maleic ester polymer in which at least 90 mol % of the ester groups are primary alkyl groups having a molar distribution in accordance with the following tabulation:

| Primary alkyl groups | Mol % Present |
| --- | --- |
| Linear $C_8$ | 5 to 20 |
| 2-Ethylhexyl | 10 to 50 |
| Linear $C_{10}$ | 5 to 20 |
| Linear $C_{12}$ | 10 to 40 |
| Linear $C_{14}$ | 5 to 20 |
| Linear $C_{16}$ | 3 to 15 |
| Linear $C_{18}$ | 1 to 10 | wherein the total mol percentage of the tabulated primary alkyl groups is in the range of 90 to 100 mol %. In an especially preferred form of this embodiment, the vinylaromatic of said alternating vinylaromatic-maleic ester polymer is (i) styrene, (ii) one or more alkylstyrenes having 9 to 15 carbon atoms per molecule, or (iii) a combination of (i) and (ii).

In the various preferred embodiments described above it is especially preferred to utilize a hydrogenated poly-α-olefin oligomer that has a kinematic viscosity of about 2 cSt at 100° C.

Other embodiments and features of this invention will become still further apparent from the ensuing description and appended claims.

Component a)

The mineral oil base stock used in the compositions of this invention falls in the specification category of about 90N to about 140N, and can be a single mineral oil or a blend of two or more mineral oils. Naphthenic base oils can be used, and these are preferably highly refined oils such as solvent-treated neutral oils. Preferred base stocks for use in this invention are paraffinic oils, such as solvent refined paraffinic base stocks, hydrotreated paraffinic base stocks, hydrotreated and catalytically dewaxed paraffinic base stocks, and the like. Some aromatic oils may be suitable, though are less preferred. Blends, preferably those containing a major amount of paraffinic base stock are also suitable.

The mineral oils can be refined from crude oil of any source including Gulf Coast, Midcontinent, Pennsylvania, California, Alaska, Middle East, North Sea and the like. Standard refinery operations may be used in processing the mineral oil.

A considerable number of suitable mineral oils are available from various petroleum refiners.

Component b)

As noted above, the oleaginous compositions of this invention comprise a minor amount (i.e., less than 50 percent by weight) of at least one poly-$\alpha$-olefin oligomer fluid having a kinematic viscosity at 100° C. of about 2 cSt. Such fluids are formed by oligomerization of at least one 1-alkene hydrocarbon having in the range of 6 to 20, preferably 8 to 16, more preferably 10 to 12 and most preferably 10, carbon atoms in the molecule. The oligomerization is usually performed catalytically. The oligomer fluid can be a hydrogenated oligomer fluid or an unhydrogenated oligomer fluid. Hydrogenated oligomers are preferred, and hydrogenated oligomers formed from 1-decene are particularly preferred.

Methods for the production of such liquid oligomeric 1-alkene hydrocarbons are known and reported in the literature. See for example U.S. Pat. Nos. 3,763,244; 3,780,128; 4,172,855; 4,218,330; and 4,950,822. Additionally, hydrogenated 1-alkene oligomers of this type are available as articles of commerce, for example, under the trade designation ETHYLFLO 162 poly-e-olefin oils (Ethyl Corporation; Ethyl Canada Limited; Ethyl S.A.). Tabulated below are data concerning typical composition and properties of this product.

ETHYLFLO 162 poly-$\alpha$-olefin oil

Composition—Monomer 0.4, Dimer 90.7, Trimer 8.3, Tetramer 0.6.

Properties—Viscosity at 100° C: 1.80 cSt; Viscosity at 40° C.: 5.54 cSt; Viscosity at −18° C.: n.d.; Viscosity at −40° C.: 306 cSt; Pour point: −63° C.; Flash point (ASTM D 92): 165° C.; NOACK volatility: 99%.

Suitable 1-alkene oligomers are also available from other suppliers. As is well known, hydrogenated oligomers of this type contain little, if any, residual ethylenic unsaturation, whereas unhydrogenated oligomers contain some residual unsaturation. Preferred oligomers are formed by use of a Friedel-Crafts catalyst (especially boron trifluoride promoted with water or a $C_{1-20}$ alkanol) followed by catalytic hydrogenation of the oligomer so formed using procedures such as are described in the foregoing U.S. patents.

Other catalyst systems which can be used to form oligomers of 1-alkene hydrocarbons, which, on hydrogenation, provide suitable oleaginous liquids include Ziegler catalysts such as ethyl aluminum sesquichloride with titanium tetrachloride, aluminum alkyl catalysts, chromium oxide catalysts on silica or alumina supports and a system in which a boron trifluoride catalyst oligomerization is followed by treatment with an organic peroxide.

Mixtures or blends of 1-alkene oligomers can also be used in the practice of this invention provided the overall blend possesses the requisite viscosity characteristics as specified above. A typical example of a suitable blend of hydrogenated 1-decene oligomers is as follows:

75/25 Blend of ETHYLFLO 162 and ETHYLFLO 164 poly-$\alpha$-olefin oils

Composition—Monomer 0.3, Dimer 66.8, Trimer 27.3, Tetramer 4.8, Pentamer 0.8.

Properties—Viscosity at 100° C.: 2.19 cSt; Viscosity at 40° C: 7.05 cSt; Viscosity at −18° C.: 84.4 cSt; Viscosity at −40° C.: 464 cSt; Pour point: <−65° C; Flash point (ASTM D 92): 166° C.; NOACK volatility: 78.2%.

Component c)

Vinylaromatic-maleic ester polymeric viscosity index improvers useful in the practice of this invention can be based on alternating or block or random copolymeric backbones formed from (i) one or more vinylaromatic monomers and (ii) maleic anhydride, maleic acid or mono- or diesters of maleic acid, or mixtures of any two or more of such maleic monomers. The vinylaromatic monomers include styrene, $\alpha$-methyl styrene, ring-alkyl substituted styrenes, vinylnaphthalenes, and the like. Styrene is the preferred monomer. However, combinations of a major amount (on a molar basis) of styrene with minor amounts of other vinylaromatic monomers such as o-methylstyrene, m-methylstyrene, p-methylstyrene, p-ethylstyrene, $\alpha$-methylstyrene, 2,4-dimethylstyrene, 3,5-dimethylstyrene, and the like are also quite useful. Also combinations of styrene and/or other vinylaromatics with minor amounts (e.g., up to 20 mole %) of other vinyl monomers such as vinyl alkyl ethers, vinyl esters, etc. can be considered for use.

The preferred comonomer for copolymerization with the vinylaromatic monomer(s) is maleic anhydride. Most preferably maleic anhydride is copolymerized with one or more vinylaromatic monomers in molar proportions in the range of from 1 to 2 moles of vinylaromatics per mole of maleic anhydride (or other maleic monomer, such as maleic acid, maleic ester, or the like). Use of equimolar proportions is especially preferred. Thus alternating polymers made from styrene and maleic anhydride are especially preferred for use in preparing the component c) viscosity index improvers employed in the compositions of this invention.

Copolymerization of the vinylaromatic monomer(s) with the maleic-type monomer(s) is usually effected in a suitable liquid aromatic hydrocarbon such as toluene, xylene, ethylbenzene, etc., at temperatures in the range of about 75° to about 130° C (preferably 80° to 100° C.) using a suitable free radical initiator such as benzoyl peroxide, acetyl peroxide, azoisobutyronitrile, tert-butyl perbenzoate, cumene hydroperoxide, and the like.

Amounts of initiator in the range of about 0/025 to about 5 wt % based on total weight of monomers charged are generally preferred.

It is most preferred to add a small amount of a hindered phenolic antioxidant to the polymerization reaction mixture after the polymerization has been carried to the desired stage (e.g., when a polymer of Mw in the range of about 10,000 to about 400,000 has been formed). The hindered phenol serves the dual role of acting as a chain terminator and as a stabilizer for the polymer to inhibit oxidative degradation during exposure to air or oxygen. The hindered phenols can be monohydric or polyhydric and mononuclear or polynuclear. Such compounds as 2,6-di-tert-butylphenol, 2,6-di-tert-butyl-p-cresol, 2,4-dimethyl-6-tert-butyl phenol, and 4,4'-methylenebis(2,6-di-tert-butylphenol) are typical examples.

When using maleic anhydride, maleic acid, or partial esters of maleic acid, the resultant polymer is reacted with a suitable monohydric alcohol or mixture of alcohols, preferably one or more alkanols, most preferably primary alkanols, although minor amounts (e.g., 20 mole % or less) of secondary and/or tertiary alcohol may be used in combination with primary alkanol(s). Small amounts of other substances that react with the carboxylic acid functionality of the polymer can also be employed such as amines, hydrazine, and the like. For details concerning formation of suitable vinylaromatic-maleic ester polymers, see U.S. Pat. No. 2,570,846. For details concerning formation of suitable vinylaromatic-maleic ester polymers using combinations of alcohols and amines or alcohols and hydrazines, see U.S. Pat. Nos. 3,702,300; 3,933,761; 3,956,149; 3,959,159; 4,080,303; 4,284,414; 4,604,221; 4,607,173; 4,654,050; 4,654,403; and 4,734,446. While the polymers described in these patent disclosures are satisfactory and can be effectively used in the practice of this invention, polymers such as are described in Examples 1–7 hereinafter are preferred. The disclosures of each of the foregoing patents are incorporated herein by reference.

When conducting esterification of the vinylaromatic-maleic-type copolymer the alcohol or mixture of alcohols is preferably reacted with the copolymer at temperatures in the range of about 110° to about 200° C. for 3 to 12 hours using an esterification catalyst such as concentrated sulfuric acid, p-toluene sulfonic acid, etc. As a general rule, the higher the temperature the shorter the reaction time. It is particularly desirable to remove water and/or excess alcohols(s) by use of stripping or distillation procedures. A suitable base such as an amine is then added to neutralize acid in the system, such as the sulfuric acid catalyst. Complete neutralization reaction is best effected by maintaining the mixture at 130° to 160° C. for 1 to 2 hours with stirring.

One especially useful and highly preferred polymeric viscosity index improver for use in this invention is a vinylaromatic-maleic ester copolymer (preferably a styrene-maleic ester copolymer and most preferably an alternating styrene-maleic ester copolymer) in which the ester groups comprise primary alkyl groups having 8, 10, 12, 14, 16 and 18 carbon atoms. Examples 1–7 below describe the preparation of such highly preferred alternating styrene-maleic ester copolymeric VI improvers.

Another especially useful and highly preferred polymeric viscosity index improver for use in this invention is a vinylaromatic-maleic ester copolymer (preferably a styrene-maleic ester copolymer and most preferably an alternating styrene-maleic ester copolymer) in which the ester groups comprise primary alkyl groups having 8, 10, 12, 14, 16 and 18 carbon atoms, and wherein the polymer also contains (i) branched chain primary alkyl groups having 8 carbon atoms (especially 2-ethylhexyl groups), or (ii) branched chain primary alkyl groups having 10, 12, 14, 16, 18, 20, 22, 24 or 26 carbon atoms (especially 2-butyloctyl; an average $C_{14}$ alkyl mixture of 22% $C_{12}$, 50% $C_{14}$, and 28% $C_{16}$ groups derived from 2-alkyl alkanol mixtures; 2-hexyldecyl groups; isocetyl groups; isostearyl groups; an average $C_{18}$ alkyl mixture of 16% $C_{16}$, 52% $C_{16}$, 52% $C_{18}$, and 32% $C_{20}$ groups derived from 2-alkyl alkanol mixtures; 2-octyldodecyl groups; isoarachidyl groups; 2-decyltetradecyl groups; or undecylpentadecyl groups; or any mixture of any two or more of this category (ii) alkyl groups), or any combination of (i) and (ii). The category (i) alkyl groups are produced using 2-ethylhexanol, and Examples 16 below describe the preparation of such highly preferred VI improvers wherein mixtures of primary alkanols which include 2-ethylhexanol are reacted with alternating styrene-maleic anhydride copolymers. Example 7 below illustrates formation of polymers having category (ii) alkyl groups by means of processes which comprise reacting mixtures of primary alkanols which include suitable branched primary alcohols with alternating styrene-maleic anhydride copolymer.

The polymeric viscosity index improver is usually employed in the form of a solution or mixture in a suitable light mineral oil, e.g., 40N to 200N hydrotreated paraffinic oil or 40N to 200N highly refined naphthenic oil.

Suitable commercially available styrene-maleic ester copolymers include Lubrizol® 3702 dispersant type viscosity improver and Lubrizol® 3715 dispersant type viscosity index improver, among others. The former is reported to have a nitrogen content of approximately 0.14 wt %, a specific gravity at 15.6° C. of 0.910 and a viscosity of 750 cSt at 100° C. The latter has a nitrogen content of approximately 0.20 wt %, a specific gravity at 15.6° C. of approximately 0.920, and a viscosity at 100° C of approximately 750 cSt. Another suitable styrene-ester polymer is Lubrizol® 3706 dispersant type viscosity improver which is reported to have a nitrogen content of approximately 0.15 wt %, and to be a blend of 86% by volume of Lubrizol® 3702 dispersant type viscosity improver and 14% by volume of Lubrizol® 3715 dispersant type viscosity improver.

The following examples illustrate methods for the preparation of preferred styrene-maleic ester polymers useful as component c) in the compositions of this invention. It will be understood and appreciated that these examples are illustrative only, and are not intended to limit, and should not be construed as limiting, the scope of this invention. Given the information presented in these examples, anyone skilled in the art can readily prepare all sorts of vinylaromatic-maleic ester polymers for evaluation as regards suitability for the practice of this invention.

EXAMPLE 1

To a 5-liter, 3-necked flask equipped with a reflux condenser, mechanical stirrer, thermometer, and heating mantle are charged 1200 g toluene, 137.6 g (1.32 mol) of styrene and 129.6 g (1.32 mol) of maleic anhydride. To the resultant mixture is added 0.1 g of benzoyl peroxide, and the mixture is maintained at approximately 80° to 90° C. over a period of 6.25 hours. approximately 2 g of ETHYL® antioxidant 728 (a methylene-bridged hindered tert-butylated phenolic antioxidant dissolved in a light mineral oil) is added as polymerization terminator. The reaction mixture is diluted with 1120 g of 45N hydrotreated paraffinic mineral oil and the toluene is removed by distillation at reduced pressure (about 25 mm Hg). To the residual polymeric product in oil is added a mixture of alcohols composed of 125 g (0.985 mol) of 2-ethyl-1-hexanol, 104 g (0.71 mol) of EPAL® 810 alcohol, 340.8 g (1.61 mol) of EPAL® 1218 alcohol, and 35 g of toluene. Then 6.4 g of concentrated sulfuric acid is introduced into the stirred mixture and the temperature is increased to 150° C. and held at this temperature for 7 hours with constant stirring. During this time water formed in the esterification is continuously removed by distillation at atmospheric pressure. At the end of the 7-hour period, a vacuum is applied to the reaction mixture in order to distill out excess unreacted alcohols. 2-Ethylhexyl amine (16.0 g) is then added in order to neutralize the sulfuric acid in the system. The resulting mixture is stirred for 2 hours at 150° C. The cooled viscous solution of the styrene-maleic ester polymer in oil is the desired product. This solution contains approximately 32% of the polymer. The weight average molecular weight ( Mw) as determined by GPC of a polymer formed in this matter was indicated to be 295,000.

EXAMPLE 2

The procedure of Example 1 is repeated except that the various components are employed in the following amounts:

Toluene, 150 g; Styrene, 17.2 g; Maleic anhydride, 16.2 g; Benzoyl peroxide, 15 mg; ETHYL® antioxidant 728, 0.6 g; Mineral oil diluent, 140 g; 2-Ethylhexyl alcohol, 13.8 g; EPAL® 810 alcohol, 11.1 g; EPAL® 1218 alcohol 36.0 g; Toluene, 2.0 g; Concentrated $H_2SO_4$, 0.85 g; 2-Ethylhexylamine, 5.10 g. The polymerization is conducted at 83°–89° C. for 6.5 hours with stirring, and the esterification is conducted with stirring over a 6.5 hour period at 140° C. for 3 hours and 150° C. for 3.5 hours. The catalyst neutralization is performed at 150° C. while stirring for 1.5 hours.

EXAMPLE 3

The general procedure of Example 1 is repeated using the following materials in the amounts specified: Toluene, 1000 g; Styrene, 86 g; Maleic anhydride, 81 g; Benzoyl peroxide, 0.075 g; ETHYL® antioxidant 728, 2 g; Mineral oil diluent, 700 g; 2-Ethylhexyl alcohol, 39 g; EPAL® 810 alcohol, 70 g; EPAL® 1218 alcohol, 218 g; Toluene, 30 g; Concentrated $H_2SO_4$, 4 g; 2-Ethylhexylamine, 10 g. The polymerization is conducted at 84°–88° C. for 4.5 hours with stirring, and the esterification is conducted with stirring over a 6-hour period at 130° C. for 1 hour, 140° C. for 1 hour and 150° C. for 4 hours. The catalyst neutralization is performed at 150° C. for 1.5 hours with stirring.

EXAMPLE 4

The procedure of Example 3 is repeated using the following materials in the amounts specified: Toluene, 200 g; Styrene, 17.2 g; Maleic anhydride, 16.2 g; Benzoyl peroxide, 0.05 g; ETHYL® antioxidant 728, 0.6 g; Mineral oil diluent, 140 g; 1-Butanol, 3 g; 2-Ethylhexyl alcohol, 7.8 g; EPAL® 810 alcohol, 14 g; EPAL® 1218 alcohol, 14 g; EPAL® 1218 alcohol, 44 g; Toluene 10.2 g; Concentrated $H_2SO_4$, 0.8 g; 2-Ethylhexyl amine 2.0 g. The polymerization is performed at 86°–89° C. for 2.5 hours with stirring. The esterification is performed with stirring over a 5.5-hour period at 130° C. for 2 hours, 140° C. for 2.5 hours, and 150° C. for 1 hour. The catalyst neutralization is accomplished at 750° C. for 1.5 hours while stirring.

EXAMPLE 5

Example 1 is repeated except that the following ingredients are used under the conditions specified herein: Toluene, 200 g; Styrene, 17.2 g; Maleic anhydride, 16.2 g; Benzoyl peroxide, 0.015 g; ETHYL® antioxidant 728, 0.6 g; Mineral oil diluent, 140 g; 2-Ethylhexyl alcohol, 16 g; EPAL® 810 alcohol, 13 g; EPAL® 12–18 alcohol, 38 g; EXXAL® 16 alcohol (isocetyl alcohol; Exxon Chemical Company), 4.8 g; Toluene, 9.5 g; Concentrated $H_2SO_4$, 0.8 g; 2-Ethylhexylamine, 2 g. The polymerization is performed at 86°–90° C. for 5.25 hours with stirring. The esterification is performed with stirring for a 6-hour period (140° C. for 2 hours and 150° for 4 hours). The catalyst neutralization is conducted at 150° C. for 1.5 hours with stirring.

EXAMPLE 6

Using the general procedure of Example 1, the following ingredients are used in the amounts specified and with modifications referred to herein: Toluene, 200 g; Styrene, 17.2 g; Maleic anhydride, 16.2 g; Benzoyl peroxide, 0.015 g; ETHYL® antioxidant 728, 0.6 g; Mineral oil diluent, 140 g; 2-Ethylhexyl alcohol, 16 g; EPAL® 810 alcohol, 13 g; EPAL® 1218 alcohol, 43 g; Toluene, 9.5 g; Concentrated sulfuric acid, 0.8 g; 2-Ethylhexylamine, 2 g. The polymerization is conducted at 83°–89° C. for 5 hours with stirring. The esterification is performed for a 6-hour period (140° C. for 2 hours and 150° C. for 4 hours). Catalyst neutralization is accomplished at 150° C. for 1.5 hours with constant stirring.

EXAMPLE 7

The procedure of Example 1 is repeated ten times, in each case with the substitution of one of the following respective branched chain primary alcohols for the 2-ethylhexanol in the esterification step:
1) 2-Butyloctanol (JARCOL I-12 alcohol; Jarchem Industries, Inc.)
2) 2-Alkyl-alkanol mixture (JARCOL I-14T alcohol)
3) 2-Hexyldecanol (JARCOL I-16 alcohol)
4) Isocetyl alcohol (EXXAL 16 alcohol; Exxon Chemical Company)
5) Isostearyl alcohol (EXXAL 18 alcohol
6) 2-Alkyl-alkanol mixture (JARCOL I-18T alcohol)
7) 2-Octyldodecanol (JARCOL I-20 alcohol)
8) Isoarachidyl alcohol (EXXAL 20 alcohol)
9) 2-Decyltetradecanol (JARCOL I-24 alcohol)
10) Undecylpentadecanol (EXXAL 26 alcohol)

Proportions of Components a), b) and c)

As noted above, the poly-α-olefin oligomer and the vinylaromatic-maleic ester viscosity index improver are used in amounts and proportions in the particular mineral oil being used as component a) such that the resultant composition has a Brookfield viscosity at −40° C. of 20,000 cP or less and preferably of 15,000 cP or less. The particular amount used are thus susceptible to variation and will depend on the characteristics and properties of each of components a), b) and c) being used in any given case. Generally speaking, however, the composition will contain at least 7 and preferably at least 9 percent by weight of component b)—i.e., the oligomer—and at least 0.3, preferably at least 0.6, more preferably at least 1.0, and most preferably at least 1.3 percent by weight of component c)—i.e., the polymeric VI improver. In any case, the total amount of components b) and c) will be less than 50% by weight of the total composition. It should be noted that the foregoing weight percentages for the component c) polymeric VI improver refer to the weight of the actual polymer and not the weight of a solution or mixture of the polymer in a diluent or solvent, the latter being the form in which the VI improver is most often employed. In short, the concentrations of component c) as set forth herein refer to the weight of active polymeric VI improver and exclude the weight of any solvents or diluents associated therewith.

Other Components and Additives

A. Other Oils. If desired, the compositions of this invention can contain minor amounts (preferably no more than 30 wt %) of other suitable oleaginous base stocks for imparting additional properties required and/or desired for the particular end use for which the finished lubricant or functional fluid is intended. The chief requirements are that (1) any such additional base stock should not adversely affect the low temperature viscosity performance to the extent that the resultant composition fails to possess a Brookfield viscosity at −40° C. of 20,000 cP or less, and preferably of 15,000 cP or less; and (2) any such additional base stock should exhibit suitable compatibility with the other components of the composition so as not to significantly impair its stability, homogeneity, or performance capabilities.

Alkylene oxide polymers and interpolymers and derivatives thereof where the terminal hydroxyl groups have been modified by esterification, etherification, etc., constitute one class of synthetic oils that can be considered for use in the compositions of this invention. These are exemplified by the oils prepared through polymerization of alkylene oxides such as ethylene oxide or propylene oxide, and the alkyl and aryl ethers of these polyoxyalkylene polymers (e.g., methyl polyisopropylene glycol ether having an average molecular weight of 1000, diphenyl ether of polyethylene glycol having a molecular weight of 500–1000, diethyl ether of polypropylene glycol having a molecular weight of 1000–1500) or mono- and poly-carboxylic esters thereof, for example, the acetic acid ester, mixed $C_3$–$C_6$ fatty acid esters, or the $C_{13}$ Oxo acid diester of tetraethylene glycol.

Another class of synthetic oils that may be considered for use comprises the esters of dicarboxylic acids (e.g., phthalic acid, succinic acid, maleic acid, azelaic acid, suberic acid, sebacic acid, fumaric acid, adipic acid, linoleic acid dimer) with a variety of alcohols (e.g., butyl alcohol, hexyl alcohol, dodecyl alcohol, 2-ethylhexyl alcohol, ethylene glycol). Specific examples of these esters include dibutyl adipate, di(2-ethylhexyl)adipate, di-dodecyl adipate, di-(isotridecyl)-adipate (e.g., BASF Glissofluid A13), di(2-ethylhexyl) sebacate, dilauryl sebacate, di-n-hexyl fumarate, dioctyl sebacate, diisooctyl azelate, diisodecyl azelate, dioctyl phthalate, didecyl phthalate, mixed $C_9$ and $C_{11}$ dialkylphthalates (e.g., ICI Emkarate 911P ester oil), di(eicosyl)sebacate, the 2-ethylhexyl diester of linoleic acid dimer, and the complex ester formed by reacting one mole of sebacic acid with two moles of tetraethylene glycol and two moles of 2-ethylhexanoic acid.

Synthetic esters which may be used also include those made from $C_3$–$C_{12}$ monocarboxylic acids and polyols and polyol ethers such as neopentyl glycol, trimethylolpropane, pentaerythritol and dipentaerythritol. Trimethylol propane tripelargonate, trimethylol propane trioleate, pentaerythritol tetraheptanoate and pentaerythritol tetracaproate serve as examples.

Silicon-based oils such as the polyalkyl-, polyaryl-, polyalkoxy-, or polyaryloxy-siloxane oils and silicate oils comprise another class of synthetic lubricants that may be selected for use. These include, for example, tetraethyl silicate, tetraisopropyl silicate, tetra-(2-ethylhexyl)silicate, tetra-(p-tert-butylphenyl) silicate, poly(methyl)siloxanes, and poly(methylphenyl)siloxanes. Other synthetic lubricating oils include liquid esters of phosphorus-containing acids (e.g., tricresyl phosphate, trioctyl phosphate, triphenyl phosphite, and diethyl ester of decane phosphonic acid.

Among additional oils which may be considered for use in suitable amounts in the compositions of this invention are homo- and inter-polymers of $C_2$–$C_{12}$ olefins, polyglycols, alkylated aromatics, carbonates, thiocarbonates, orthoformates, borates and halogenated hydrocarbons. Representative of such oils are homo- and interpolymers of $C_2$–$C_{12}$ monoolefinic hydrocarbons, alkylated benzenes (e.g., dodecyl benzenes, didodecyl benzenes, tetradecyl benzenes, dinonyl benzenes, di-(2-ethylhexyl)benzenes, etc.

Illustrative additional oils of lubricating viscosity which may be used in the blends of this invention include liquid natural fatty oils and esters such as castor oil, olive oil, peanut oil, rapeseed oil, corn oil, sesame oil, cottonseed oil, soybean oil, sunflower oil, safflower oil, hemp oil, linseed oil, tung oil, citicica oil, jojoba oil, meadowfoam oil, and the like. Such oils may be partially or fully hydrogenated, if desired, provided of course that they retain their oleaginous character.

B. Additives. The additives that can be, and preferably are, included in the compositions of this invention can vary widely depending on such factors as the use or service for which the finished composition is intended, the severity of the service conditions to which the composition is likely to be exposed, the properties the particular composition is to possess, the specifications the particular composition is to satisfy, and the like. Thus the oil may be formulated with additives or additive concentrates appropriate for service as crankcase lubricants for spark ignition or diesel internal combustion engines, as lubricants for use as cylinder oils, as functional fluids for use as automatic transmission fluids, and as oils for use as manual transmission lubricants, wet brake fluids, tractor oils, gear oils, limited slip axle lubricants, etc.

Those skilled in the art are familiar with the general makeup of additive packages commonly used for these various types of service. Anyone not familiar with the technology need only refer to the tremendous amount of patent literature on the subject, especially U.S. Patents issued during the last ten years. For a review of crankcase lubricating oil additives, reference may be had to Watson, R. L. and McDonnell, Jr., "Additives—The Right Stuff for Automotive Engine Oils" Society of Automotive Engineers Special Publication SP-603 (Fuels and Lubrication Technology), pages 17–28 (1984) and references cited therein, all disclosures of which are incorporated herein by reference. Particularly preferred crankcase lubricating oil additive compositions are described in Examples I through XVIII of U.S. Pat. No. 4,904,401 and particularly preferred automatic transmission additive compositions are described in U.S. Pat. No. 4,857,214. All disclosures of these two patents are incorporated herein by reference.

Described below are illustrative examples of some of the types of conventional additives that may be employed in conventional amounts in the compositions of this invention.

Any of a variety of ashless dispersants can be utilized in the compositions of this invention. These include the following types:

Type A—Carboxylic Ashless Dispersants. These are reaction products of an acylating agent (e.g., a monocarboxylic acid, dicarboxylic acid, polycarboxylic acid, or derivatives thereof) with one or more polyamines and/or polyhydroxy compounds. These products, herein referred to as carboxylic ashless dispersants, are described in many patents, including British Patent Specification 1,306,529 and the following U.S. Patents which are incorporated herein by reference: U.S. Pat. Nos. 3,163,603; 3,184,474; 3,215,707; 3,219,666; 3,271,310; 3,272,746; 3,281,357; 3,306,908; 3,311,558; 3,316,177; 3,340,281; 3,341,542; 3,346,493; 3,381,022; 3,399,141; 3,415,750; 3,433,744; 3,444,170; 3,448,048; 3,448,049; 3,451,933; 3,454,607; 3,467,668; 3,522,179; 3,541,012; 3,542,678; 3,574,101; 3,576,743; 3,630,904; 3,632,510; 3,632,511; 3,697,428; 3,725,441; 3,868,330; 3,948,800; 4,234,435; and Re 26,433.

There are a number of sub-categories of carboxylic ashless dispersants. One such sub-category which constitutes a preferred type is composed of the polyamine succinamides and more preferably the polyamine succinimides in which the succinic group contains a hydrocarbyl substituent containing at least 30 carbon atoms. The polyamine used in forming such compounds contains at least one primary amino group capable of forming an imide group on reaction with a hydrocarbon-substituted succinic acid or acid derivative thereof such an anhydride, lower alkyl ester, acid halide, or acid-ester. Representative examples of such dispersants are given in U.S. Pat. Nos. 3,172,892; 3,202,678; 3,216,936; 3,219,666; 3,254,025; 3,272,746; and 4,234,435, the disclosures of which are incorporated herein by reference. The alkenyl succinimides may be formed by conventional methods such as by heating an alkenyl succinic anhydride, acid, acid-ester, acid halide, or lower alkyl ester with a polyamine containing at least one primary amino group. The alkenyl succinic anhydride may be made readily by heating a mixture of olefin and maleic anhydride to about 180°–220° C. The olefin is preferably a polymer or copolymer of a lower monoolefin such as ethylene, propylene, 1-butene, isobutene and the like. The more preferred source of alkenyl group is from polyisobutene having a number average molecular weight of up to 100,000 or higher. In a still more preferred embodiment the alkenyl group is a polyisobutenyl group having a number average molecular weight (determined using the method described in detail hereinafter) of about 500–5,000, and preferably about 700–2,500, more preferably about 700–1,400, and especially 800–1,200. The isobutene used in making the polyisobutene is usually (but not necessarily) a mixture of isobutene and other $C_4$ isomers such as 1-butene. Thus, strictly speaking, the acylating agent formed from maleic anhydride and "polyisobutene" made from such mixtures of isobutene and other $C_4$ isomers such as 1-butene, can be termed a "polybutenyl succinic anhydride" and a succinimide made therewith can be termed a "polybutenyl succinimide". However, it is common to refer to such substances as "polyisobutenyl succinic anhydride" and "polyisobutenyl succinimide", respectively. As used herein "polyisobutenyl" is used to denote the alkenyl moiety whether made from a highly pure isobutene or a more impure mixture of isobutene and other $C_4$ isomers such as 1-butene.

Polyamines which may be employed in forming the ashless dispersant include any that have at least one primary amino group which can react to form an imide group. A few representative examples include branched-chain alkanes containing two or more primary amino groups such as tetraamino-neopentane, etc.; polyaminoalkanols such as 2-(2-aminoethylamino)-ethanol and 2-[2-(2-aminoethylamino)-ethylamino]-ethanol; heterocyclic compounds containing two or more amino groups at least one of which is a primary amino group such as 1-(β-aminoethyl)-2-imidazolidone, 2-(2-amino-ethylamino)-5-nitropyridine, 3-amino-N-ethylpiperidine, 2-(2-amino-ethyl)-pyridine, 5-aminoindole, 3-amino-5-mercapto-1,2,4-triazole, and 4-(aminomethyl)-piperidine; and the alkylene polyamines such as propylene diamine, dipropylene triamine, di-(1,2-butylene)triamine, N-(2-aminoethyl)-1,3-propanediamine, hexamethylenediamine and tetra-(1,2-propylene)pentamine.

The most preferred amines are the ethylene polyamines which can be depicted by the formula

wherein n is an integer from one to about ten. These include: ethylene diamine, diethylene triamine, triethylene tetramine, tetraethylene pentamine, pentaethylene hexamine, and the like, including mixtures thereof in which case n is the average value of the mixture. These ethylene polyamines have a primary amine group at each end so can form mono-alkenylsuccinimides and bis-alkenylsuccinimides. Commercially available ethylene polyamine mixtures usually contain minor amounts of branched species and cyclic species such as N-aminoethyl piperazine, N,N'-bis (aminoethyl)piperazine, N,N'-bis(piperazinyl)ethane, and like compounds. The preferred commercial mixtures have approximate overall compositions falling in the range corresponding to diethylene triamine to pentaethylene hexamine, mixtures generally corresponding in overall makeup to tetraethylene pentamine being most preferred.

Methods for the production of polyalkylene polyamines are known and reported in the literature. See for example U.S. Pat. No. 4,827,037 and references cited therein, all disclosures of such patent and cited references being incorporated herein by reference.

Thus especially preferred ashless dispersants for use in the present invention are the products of reaction of a polyethylene polyamine, e.g. triethylene tetramine or tetraethylene pentamine, with a hydrocarbon-substituted carboxylic acid or anhydride (or other suitable acid derivative) made by reaction of a polyolefin, preferably polyisobutene, having a number average molecular weight of 500 to 5,000, preferably 700 to 2,500, more preferably 700 to 1,400 and especially 800 to 1,200, with an unsaturated polycarboxylic acid or anhydride, e.g., maleic anhydride, maleic acid, fumaric acid, or the like, including mixtures of two or more such substances.

As used herein the term "succinimide" is meant to encompass the completed reaction product from reaction between the amine reactant(s) and the hydrocarbon-substituted carboxylic acid or anhydride (or like acid derivative) reactant (s), and is intended to encompass compounds wherein the product may have amide, amidine, and/or salt linkages in addition to the imide linkage of the type that results from the reaction of a primary amino group and an anhydride moiety.

Residual unsaturation in the alkenyl group of the alkenyl succinimide may be used as a reaction site, if desired. For example the alkenyl substituent may be hydrogenated to form an alkyl substituent. Similarly the olefinic bond(s) in the alkenyl substituent may be sulfurized, halogenated, hydrohalogenated or the like. Ordinarily, there is little to be gained by use of such techniques, and thus the use of alkenyl succinimides is preferred.

Another sub-category of carboxylic ashless dispersants which can be used in the compositions of this invention includes alkenyl succinic acid esters and diesters of alcohols containing 1–20 carbon atoms and 1–6 hydroxyl groups. Representative examples are described in U.S. Pat. Nos. 3,331,776; 3,381,022; and 3,522,179, the disclosures of which are incorporated herein by reference. The alkenyl succinic portion of these esters corresponds to the alkenyl succinic portion of the succinimides described above including the same preferred and most preferred subgenus, e.g., alkenyl succinic acids and anhydrides, etc., where the alkenyl group contains at least 30 carbon atoms and notably, polyisobutenyl succinic acids and anhydrides wherein the polyisobutenyl group has a number average molecular weight of 500 to 5,000, preferably 700 to 2,500, more preferably 700 to 1,400, and especially 800 to 1,200. As in the case of the succinimides, the alkenyl group can be hydrogenated or subjected to other reactions involving olefinic double bonds.

Alcohols useful in preparing the esters include methanol, ethanol, 2-methylpropanol, octadecanol, eicosanol, ethylene glycol, diethylene glycol, tetraethylene glycol, diethylene glycol monoethylether, propylene glycol, tripropylene glycol, glycerol, sorbitol, 1,1,1-trimethylol ethane, 1,1,1-trimethylol propane, 1,1,1-trimethylol butane, pentaerythritol, dipentaerythritol, and the like.

The succinic esters are readily made by merely heating a mixture of alkenyl succinic acid, anhydrides or lower alkyl (e.g., $C_1$–$C_4$) ester with the alcohol while distilling out water or lower alkanol. In the case of acid-esters less alcohol is used. In fact, acid-esters made from alkenyl succinic anhydrides do not evolve water. In another method the alkenyl succinic acid or anhydrides can be merely reacted with an appropriate alkylene oxide such as ethylene oxide, propylene oxide, and the like, including mixtures thereof.

Still another sub-category of carboxylic ashless dispersants useful in forming compositions of this invention comprises an alkenyl succinic ester-amide mixture. These may be made by heating the above-described alkenyl succinic acids, anhydrides or lower alkyl esters or etc. with an alcohol and an amine either sequentially or in a mixture. The alcohols and amines described above are also useful in this embodiment. Alternatively, amino alcohols can be used alone or with the alcohol and/or amine to form the ester-amide mixtures. The amino alcohol can contain 1–20 carbon atoms, 1–6 hydroxy groups and 1–4 amine nitrogen atoms. Examples are ethanolamine, diethanolamine, N-ethanol-diethylene triamine, and trimethylol aminomethane.

Here again, the alkenyl group of the succinic ester-amide can be hydrogenated or subjected to other reactions involving olefinic double bonds.

Representative examples of suitable ester-amide mixtures are referred to in U.S. Pat. Nos. 3,184,474; 3,576,743; 3,632,511; 3,804,763; 3,836,471; 3,862,981; 3,936,480; 3,948,800; 3,950,341; 3,957,854; 3,957,855; 3,991,098; 4,071,548; and 4,173,540, the disclosures of which are incorporated herein by reference.

Yet another sub-category of carboxylic ashless dispersants which can be used comprises the Mannich-based derivatives of hydroxyaryl succinimides. Such compounds can be made by reacting a polyalkenyl succinic anhydride with an aminophenol to produce an N-(hydroxyaryl) hydrocarbyl succinimide which is then reacted with an alkylene diamine or polyalkylene polyamine and an aldehyde (e.g., formaldehyde), in a Mannich-base reaction. Details of such synthesis are set forth in U.S. Pat. No. 4,354,950, the disclosure of which is incorporated herein by reference. As in the case of the other carboxylic ashless dispersants discussed above, the alkenyl succinic anhydride or like acylating agent is derived from a polyolefin, preferably a polyisobutene, having a number average molecular weight of 500 to 5,000, preferably 700 to 2,500, more preferably 700 to 1,400, and especially 800 to 1,200. Likewise, residual unsaturation in the polyalkenyl substituent group can be used as a reaction site as for example, by hydrogenation, sulfurization, or the like.

Type B—Mannich polyamine dispersants. This category of ashless dispersant which can be utilized in the compositions of this invention is comprised of reaction products of an alkyl phenol, with one or more aliphatic aldehydes containing from 1 to about 7 carbon atoms (especially formaldehyde and derivatives thereof), and polyamines (especially polyalkylene polyamines of the type described hereinabove). Examples of these Mannich polyamine dispersants are described in the following U.S. Patents, the disclosures of which are incorporated herein by reference thereto: U.S. Pat. Nos. 2,459,112; 2,962,442; 2,984,550; 3,036,003; 3,166,516; 3,236,770; 3,368,972; 3,413,347; 3,442,808; 3,448,047; 3,454,497; 3,459,661; 3,493,520; 3,539,633; 3,558,743; 3,586,629; 3,591,598; 3,600,372; 3,634,515; 3,649,229; 3,697,574; 3,703,536; 3,704,308; 3,725,277; 3,725,480; 3,726,882; 3,736,357; 3,751,365; 3,756,953; 3,793,202; 3,798,165; 3,798,247; 3,803,039.; 3,872,019; 3,980,569; and 4,011,380.

The polyamine group of the Mannich polyamine dispersants is derived from polyamine compounds characterized by containing a group of the structure —NH— wherein the two remaining valances of the nitrogen are satisfied by hydrogen, amino, or organic radicals bonded to said nitrogen atom. These compounds include aliphatic, aromatic, heterocyclic and carbocyclic polyamines. The source of the oil-soluble hydrocarbyl group in the Mannich polyamine dispersant is a hydrocarbyl-substituted hydroxy aromatic compound comprising the reaction product of a hydroxy aromatic compound, according to well known procedures, with a hydrocarbyl donating agent or hydrocarbon source. The hydrocarbyl substituent provides substantial oil solubility to the hydroxy aromatic compound and, preferably, is substantially aliphatic in character. Commonly, the hydrocarbyl substituent is derived from a polyolefin having at least about 40 carbon atoms. The hydrocarbon source should be substantially free from pendant groups which render the hydrocarbyl group oil insoluble. Examples of acceptable substituent groups are halide, hydroxy, ether, carboxy, ester, amide, nitro and cyano. However, these substituent groups preferably comprise no more than about 10 weight percent of the hydrocarbon source.

The preferred hydrocarbon sources for preparation of the Mannich polyamine dispersants are those derived from substantially saturated petroleum fractions and olefin polymers, preferably polymers of mono-olefins having from 2 to about 30 carbon atoms. The hydrocarbon course can be derived, for example, from polymers of olefins such as ethylene, propene, 1-butene, isobutene, 1-octene, 1-methylcyclohexene, 2-butene and 3-pentene. Also useful are copolymers of such olefins with other polymerizable olefinic substances such as styrene. In general, these copolymers should contain at least 80 percent and preferably about 95 percent, on a weight basis, of units derived from the aliphatic mono-olefins to preserve oil solubility. The hydrocarbon source generally contains at least about 40 and preferably at least about 50 carbon atoms to provide substantial oil solubility to the dispersant. The olefin polymers having a number average molecular weight between about 600 and 5,000 are preferred for reasons of easy reactivity and low cost. However, polymers of higher molecular weight can also be used. Especially suitable hydrocarbon sources are isobutylene polymers.

The Mannich polyamine dispersants are generally prepared by reacting a hydrocarbyl-substituted hydroxy aromatic compound with an aldehyde and a polyamine. Typically, the substituted hydroxy aromatic compound is contacted with from about 0.1 to about 10 moles of polyamine and about 0.1 to about 10 moles of aldehyde per mole of substituted hydroxy aromatic compound. The reactants are mixed and heated to a temperature above about 80° C. to initiate the reaction. Preferably, the reaction is carried out at a temperature from about 100° to about 250° C. The resulting Mannich product has a predominantly benzylamine linkage between the aromatic compound and the polyamine. The reaction can be carried out in an inert diluent such as mineral oil, benzene, toluene, naphtha, ligroin, or other inert solvents to facilitate control of viscosity, temperature and reaction rate.

Suitable polyamines for use in preparation of the Mannich polyamine dispersants include, but are not limited to, methylene polyamines, ethylene polyamines, butylene polyamines, propylene polyamines, pentylene polyamines, hexylene polyamines and heptylene polyamines. The higher homologs of such amines and related amino-alkyl-substituted piperazines are also useful. Specific examples of such polyamines include ethylene diamine, triethylene tetramine, tris(2-aminoethyl)amine, propylene diamine, pentamethylene diamine, hexamethylene diamine, heptamethylene diamine, octamethylene diamine, decamethylene diamine, di(heptamethylene) triamine, pentaethylene hexamine, di(trimethylene) triamine, 2-heptyl-3-(2-aminopropyl)imidazoline, 1,3-bis(2-aminoethyl) imidazoline, 1-(2-aminopropyl)piperazine, 1,4-bis(2- aminoethyl)piperazine and 2-methyl-1-(2-aminobutyl) piperazine. Higher homologs, obtained by condensing two or more of the above mentioned amines, are also useful, as are the polyoxyalkylene polyamines.

The polyalkylene polyamines, examples of which are set forth above, are especially useful in preparing the Mannich polyamine dispersants for reasons of cost and effectiveness. Such polyamines are described in detail under the heading "Diamines and Higher Amines" in Kirk-Othmer, *Encyclopedia of Chemical Technology*, Second Edition, Vol. 7, pp. 22–39. They are prepared most conveniently by the reaction of an ethylene imine with a ring-opening reagent such as ammonia. These reactions result in the production of somewhat complex mixtures of polyalkylene polyamines which include cyclic condensation products such as piperazines. Because of their availability, these mixtures are particularly useful in preparing the Mannich polyamine dispersants. However, it will be appreciated that satisfactory dispersants can also be obtained by use of pure polyalkylene polyamines.

Alkylene diamines and polyalkylene polyamines having one or more hydroxyalkyl substituents on the nitrogen atom are also useful in preparing the Mannich polyamine dispersants. These materials are typically obtained by reaction of the corresponding polyamine with an epoxide such as ethylene oxide or propylene oxide. Preferred hydroxyalkyl-substituted diamines and polyamines are those in which the hydroxyalkyl groups have less than about 10 carbon atoms. Examples of suitable hydroxyalkyl-substituted diamines and polyamines include, but are not limited to, N-(2-hydroxyethyl)ethylenediamine, N,N'-bis(2-hydroxyethyl)ethylenediamine, mono(hydroxypropyl)diethylenetriamine, (di(hydroxypropyl)tetraethylenepentamine and N-(3-hydroxybutyl)tetramethylenediamine. Higher homologs obtained by condensation of the above mentioned hydroxyalkyl-substituted diamines and polyamines through amine groups or through ether groups are also useful.

Any conventional formaldehyde yielding reagent is useful for the preparation of the Mannich polyamine dispersants. Examples of such formaldehyde yielding reagents are trioxane, paraformaldehyde, trioxymethylene, aqueous formalin and gaseous formaldehyde.

Type C—Polymeric polyamine dispersants. Also suitable for use in the compositions of this invention are polymers containing basic amine groups and oil solubilizing groups (for example, pendant alkyl groups having at least about 8 carbon atoms). Such polymeric dispersants are herein referred to as polymeric polyamine dispersants. Such materials include, but are not limited to, interpolymers of decyl methacrylate, vinyl decyl ether or a relatively high molecular weight olefin with aminoalkyl acrylates and aminoalkyl acrylamides. Examples of polymeric polyamine dispersants are set forth in the following patents, the disclosures of which are incorporated herein by reference: U.S. Pat. Nos. 3,329,658; 3,449,250; 3,493,520; 3,519,565; 3,666,730; 3,687,849; 3,702,300.

Type D—Post-treated ashless dispersants. Any of the ashless dispersants referred to above as types A–C can be subjected to post-treatment with one or more suitable reagents such as urea, thiourea, carbon disulfide, aldehydes, ketones, carboxylic acids, anhydrides of low molecular weight dibasic acids, nitriles, epoxides, phosphorus acids, phosphorus esters, and the like. Such post-treated ashless dispersants can be used in forming the compositions of this invention. Examples of post-treatment procedures and post-treated ashless dispersants are set forth in the following U.S. Patents, the disclosures of which are incorporated herein by reference: U.S. Pat. Nos. 3,036,003; 3,200,107; 3,216,936; 3,256,185; 3,278,550; 3,312,619; 3,366,569; 3,367,943; 3,373,111; 3,403,102; 3,442,808; 3,455,831; 3,455,832; 3,493,520; 3,502,677; 3,513,093; 3,573,010; 3,579,450; 3,591,598; 3,600,372; 3,639,242; 3,649,229; 3,649,659; 3,702,757; and 3,708,522; and 4,971,598.

Mannich-based derivatives of hydroxyaryl succinimides that have been post-treated with $C_{5-C_9}$ lactones such as e-caprolactone and optionally with other post-treating agents as described for example in U.S. Pat. No. 4,971,711 can also be utilized in the practice of this invention. The disclosures of U.S. Pat. No. 4,971,711, as well as related U.S. Pat. Nos. 4,820,432; 4,828,742; 4,866,135; 4,866,139; 4,866,140; 4,866,141; 4,866,142; 4,906,394; and 4,913,830 are incorporated herein by reference as regards additional suitable ashless dispersants which may be utilized.

Metal hydrocarbyl dithiophosphates can be employed in the compositions of this invention, whenever desired. As is well known, metal hydrocarbyl dithiophosphates are usually prepared by reacting phosphorus pentasulfide with one or more alcohols or phenolic compounds or diols to produce a hydrocarbyl dithiophosphoric acid which is then neutralized with one or more metal-containing bases. When a monohydric alcohol or phenol is used in this reaction, the final product is a metal dihydrocarbyl dithiophosphate. On the other hand, when a suitable diol (e.g., 2,4-pentanediol) is used in this reaction, the final product is a metal salt of a cyclic hydrocarbyl dithiophosphoric acid. See, for example, U.S. Pat. No. 3,089,850, the disclosure of which is incorporated herein by reference. Thus typical oil-soluble metal hydrocarbyl dithiophosphates may be represented by the formula

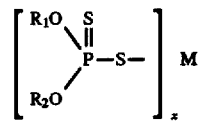

where $R_1$ and $R_2$ are, independently, hydrocarbyl groups or taken together are a single hydrocarbyl group forming a cyclic structure with the phosphorus and two oxygen atoms, preferably a hydrocarbyl-substituted trimethylene group of sufficient carbon content to render the compound oil soluble, M is a metal, and x is an integer corresponding to the valence of M. The preferred compounds are those in which $R_1$ and $R_2$ are separate hydrocarbyl groups (i.e., the metal dihydrocarbyl dithiophosphates). Usually the hydrocarbyl groups of the metal dihydrocarbyl dithiophosphates will contain no more than about 50 carbon atoms each although even higher molecular weight hydrocarbyl groups can be present in the compound. The hydrocarbyl groups include cyclic and acyclic groups, both saturated and unsaturated, such as alkyl, cycloalkyl, alkenyl, cycloalkenyl, aryl, cycloalkylalkyl, aralkyl, and the like. It will be understood that the hydrocarbyl groups may contain elements other than carbon and hydrogen provided such other elements do not detract from the predominantly hydrocarbonaceous character of the hydrocarbyl group. Thus the hydrocarbyl groups may contain ether oxygen atoms, thioether sulfur atoms, secondary or tertiary amino nitrogen atoms, and/or inert functional groups such as esterified carboxylic groups, keto groups, thioketo groups, and the like.

The metals present in the oil-soluble metal dihydrocarbyl dithiophosphates and oil-soluble metal cyclic hydrocarbyl dithiophosphates include such metals as lithium, sodium, potassium, copper, magnesium, calcium, zinc, strontium, cadmium, barium, mercury, aluminum, tin, lead, chromium, molybdenum, tungsten, manganese, iron, cobalt, nickel, ruthenium, etc., as well as combinations of two or more such metals. Of the foregoing, the salts containing group II metals, aluminum, lead, tin, molybdenum, manganese, cobalt, and/or nickel, are preferred. The dihydrocarbyl dithiophosphates of zinc and copper are particularly preferred, with the zinc salts being the most preferred type of compound for use.

The phosphorodithioic acids from which the metal salts are formed can be prepared by the reaction of about 4 moles of one or more alcohols (cyclic or acyclic) or one or more phenols or mixture of one or more alcohols and one or more phenols (or about 2 moles of one or more diols) per mole of phosphorus pentasulfide, and the reaction may be carried out within a temperature range of from about 50° to about 200° C. The reaction generally is completed in about 1 to 10 hours. Hydrogen sulfide is liberated during the reaction.

Another method for the preparation of the phosphorodithioic acids involves reaction of one or more alcohols and/or one or more phenols with phosphorus sesquisulfide in the presence of sulfur such as is described in PCT International Publication No. WO 90/07512, all disclosure of which is incorporated herein by reference. This reaction is conducted at an elevated temperature, preferably in the range of 85°–150° C. with an overall atomic P:S ratio of at least 2.5:1.

The alcohols used in forming the phosphorodithioic acids by either of the above methods are preferably primary alcohols, or secondary alcohols. Mixtures thereof are also suitable. The primary alcohols include propanol, butanol, isobutyl alcohol, pentanol, 2-ethyl-1-hexanol, isooctyl alcohol, nonanol, decanol, undecanol, dodecanol, tridecanol, tetradecanol, octadecanol, eicosanol, and the like. The primary alcohols may contain various substituent groups such as halogen atoms, nitro groups, etc., which do not interfere with the desired reaction. Among suitable secondary alcohols are included 2-butanol, 2-pentanol, 3-pentanol, 2-hexanol, 5-methyl-2-hexanol, and the like. In some cases, it is preferable to utilize mixtures of various alcohols, such as mixtures of 2-propanol with one or more higher molecular weight primary alcohols, especially primary alcohols having from 4 to about 13 carbon atoms in the molecule. Such mixtures preferably contain at least 10 mole percent of 2-propanol, and usually will contain from about 20 to about 90 mole percent of 2-propanol. In one preferred embodiment, the alcohol comprises about 30 to 50 mole percent of 2-propanol, about 30 to 50 mole percent isobutyl alcohol and about 10 to 30 mole percent of 2-ethyl-1-hexanol.

Other suitable mixtures of alcohols include 2-propanol/ butanol; 2-propanol/2-butanol; 2-propanol/2-ethyl-1-hexanol; butanol/2-ethyl-1-hexanol; isobutyl alcohol/2-ethyl-1-hexanol; and 2-propanol/tridecanol.

Cycloaliphatic alcohols suitable for use in the production of the phosphorodithioic acids include cyclopentanol, cyclohexanol, methylcyclohexanol, cyclooctanol, borneol and the like. Preferably, such alcohols are used in combination with one or more primary alkanols such as butanol, isobutyl alcohol, or the like.

Illustrative phenols which can be employed in forming the phosphorodithioic acids include phenol, o-cresol, m-cresol, p-cresol, 4-ethylphenol, 2,4-xylenol, and the like. It is desirable to employ phenolic compounds in combination with primary alkanols such propanol, butanol, hexanol, or the like.

Other alcohols which can be employed include benzyl alcohol, cyclohexenol, and their ring-alkylated analogs.

It will be appreciated that when mixtures of two or more alcohols and/or phenols are employed in forming the phosphorodithioic acid, the resultant product will normally comprise a mixture of three or more different dihydrocarbyl phosphorodithioic acids, usually in the form of a statistical distribution in relation to the number and proportions of alcohols and/or phenols used.

Illustrative diols which can be used in forming the phosphorodithioic acids include 2,4-pentanediol, 2,4-hexanediol, 3,5-heptanediol, 7-methyl-2,4-octanediol, neopentyl glycol, 2-butyl-1,3-propanediol, 2,2-diethyl-1,3-propanediol, and the like.

The preparation of the metal salts of the dihydrocarbyl dithiophosphoric acids or the cyclic hydrocarbyl dithiophosphoric acids is usually effected by reacting the acid product with a suitable metal compound such as a metal carbonate, metal hydroxide, metal alkoxide, metal oxide, or other appropriate metal salt. Simply mixing and heating such reactants is normally sufficient to cause the reaction to occur and the resulting product is usually of sufficient purity for use in the practice of this invention. Typically, the salts are formed in the presence of a diluent such as an alcohol, water or a light mineral oil. Neutral salts are prepared by reacting one equivalent of metal oxide or hydroxide with one equivalent of the acid. Basic metal salts are prepared by adding an excess (i.e., more than one equivalent) of the metal oxide or hydroxide with one equivalent of the dihydrocarbyl phosphorodithioic acid or cyclic hydrocarbyl phosphorodithioic acid.

Illustrative metal compounds which may be used in such reactions include calcium oxide, calcium hydroxide, silver oxide, silver carbonate, magnesium oxide, magnesium hydroxide, magnesium carbonate, magnesium ethoxide, zinc oxide, zinc hydroxide, strontium oxide, strontium hydroxide, cadmium oxide, cadmium hydroxide, cadmium carbonate, barium oxide, aluminum oxide, aluminum propoxide, iron carbonate, copper hydroxide, lead oxide, tin butoxide, cobalt oxide, nickel hydroxide, manganese oxide, and the like.

In some cases, incorporation of certain ingredients such as small amounts of metal acetate or acetic acid in conjunction with the metal reactant will facilitate the reaction and provide an improved product. For example, use of up to about 5% of zinc acetate in combination with the required amount of zinc oxide tends to facilitate the formation of zinc dihydrocarbyl dithiophosphates.

Examples of useful metal salts of dihydrocarbyl dithiophosphoric acids, and methods for preparing such salts are found in the prior art such as for example, U.S. Pat. Nos. 4,263,150; 4,289,635; 4,308,154; 4,322,479; 4,417,990; and 4,466,895. The disclosures of each of the foregoing patents are incorporated herein by reference.

Generally speaking, the preferred types of metal salts of dihydrocarbyl dithiophosphoric acids are the oil-soluble metal salts of dialkyl dithiophosphoric acids. Such compounds generally contain alkyl groups having at least three carbon atoms, and preferably the alkyl groups contain up to 10 carbon atoms although as noted above, even higher molecular weight alkyl groups are entirely feasible. A few illustrative zinc dialkyl dithiophosphates include zinc diisopropyl dithiophosphate, zinc dibutyl dithiophosphate, zinc diisobutyl dithiophsphate, zinc di-sec-butyl dithiophsphate, the zinc dipentyl dithiophosphates, the zinc dihexyl dithiophosphates, the zinc diheptyl dithiophosphates, the zinc dioctyl dithiophosphates, the zinc dinonyl dithiophosphates, the zinc didecyl dithiophosphates, and the higher homologs thereof. Mixtures of two or more such metal compounds are often preferred for use such as metal salts of dithiophosphoric acids formed from mixtures of isopropyl alcohol and secondary butyl alcohol; isopropyl alcohol, isobutyl alcohol, and 2-ethylhexyl alcohol; isopropyl alcohol, butyl alcohol, and pentyl alcohol; isobutyl alcohol and octyl alcohol; and the like.

If desired, the metal dihydrocarbyl dithiophosphate additives of the type described above may be treated with an epoxide to form an adduct. In general, the most suitable metal dihydrocarbyl dithiophosphates useful in forming such adducts are the zinc dihydrocarbyl dithiophosphates. The epoxides comprise alkylene oxides and arylalkylene oxides. Typical alkylene oxides which may be used include alkylene oxides having up to about 8 carbon atoms in the molecule, such as ethylene oxide, propylene oxide, 1,2-butene oxide, trimethylene oxide, tetramethylene oxide, butadiene monoepoxide, 1,2-hexene oxide, epichlorohydrin, and the like. The arylalkylene oxides are exemplified by styrene oxide. Other suitable epoxides include, for example, butyl 9,10-epoxystearate, epoxidized soybean oil, epoxidized tung oil, and epoxidized styrene-butadiene copolymer. Procedures for preparing epoxide adducts are known and are reported, for example, in U.S. Pat. No. 3,390,082, the disclosure of which is incorporated herein by reference in connection with the procedures for preparing epoxide adducts of metal dihydrocarbyl dithiophosphates.

The adduct may be obtained by simply mixing the metal phosphorodithioate and the epoxide. The reaction is usually exothermic and may be carried out within wide temperature limits from about 0° C. to about 300° C. Because the reaction is exothermic, it is best carried out by adding one reactant, usually the epoxide, in small increments to the other reactant in order to obtain convenient control of the temperature of the reaction. The reaction may be carried out in a solvent such as benzene, mineral oil., naphtha, or n-hexene.

The chemical structure of the adduct is not known. The adducts obtained by the reaction of one mole of the phosphorodithioate with from about 0.25 mole to 5 moles, usually up to about 0.75 mole or about 0.5 mole of a lower alkylene oxide, particularly ethylene oxide and propylene oxide, are the preferred adducts.

Another type of metal dihydrocarbyl phosphorodithioate additives which can be used in the compositions of this invention comprises mixed-acid metal salts of a combination of (a) at least one phosphorodithioic acid of the formula (RO)(R'O)PSSH, as exemplified above (R and R' being, independently, hydrocarbyl groups (or taken together, a single hydrocarbyl group forming a cyclic moiety with the two oxygen atoms and the phosphorus atom) of sufficient carbon content to render the salt soluble in lubricating oil), and (b) at least one aliphatic or alicyclic carboxylic acid. The carboxylic acid may be a monocarboxylic or polycarboxylic acid, usually containing from 1 to about 3 carboxy groups and preferably only one. It may contain from about 2 to about 40, preferably from about 2 to about 20 carbon atoms, and advantageously about 5 to about 20 carbon atoms. The preferred carboxylic acids are those having the formula $R^3COOH$, wherein $R^3$ is an aliphatic or alicyclic hydrocarbon-based radical preferably free from acetylenic unsaturation. Suitable acids include the butanoic, pentanoic, hexanoic, octanoic, nonanoic, decanoic, dodecanoic, octadecanoic and eicosanoic acids, as well as olefinic acids such as oleic, linoleic, and linolenic acids and linoleic acid dimer. For the most part, $R^3$ is a saturated aliphatic group and especially a branched alkyl group such as the isopropyl or 3-heptyl group. Illustrative polycarboxylic acids are succinic, alkyl- and alkenylsuccinic, adipic, sebacic and citric acids.

The mixed-acid metal salts may be prepared by merely blending a metal salt of a phosphorodithioic acid with a metal salt of a carboxylic acid in the desired ratio. The ratio of equivalents of phosphorodithioic to carboxylic acid salts is between about 0.5:1 and about 200:1. Advantageously, the ratio can be from about 0.5:1 to about 100:1, preferably from about 0.5:1 to about 50:1, and more preferably from about 0.5:1 to about 20:1. Further, the ratio can be from about 0.5:1 to about 4.5:1, preferably about 2.5:1 to about 4.25:1. For this purpose, the equivalent weight of a phosphorodithioic acid is its molecular weight divided by the number of PSSH groups therein, and that of a carboxylic acid is its molecular weight divided by the number of carboxy groups therein.

A second and preferred method for preparing the mixed-acid metal salts useful in this invention is to prepare a mixture of the acids in the desired ratio and to react the acid mixture with a suitable metal base. When this method of preparation is used, it is frequently possible to prepare a salt containing an excess of metal with respect to the number of equivalents of acid present; thus, mixed-acid metal salts containing as many as two equivalents and especially up to about 1.5 equivalents of metal per equivalent of acid may be prepared. The equivalent of a metal for this purpose is its atomic weight divided by its valence.

Variants of the above-described methods may also be used to prepare the mixed-acid metal salts useful in this invention. For example, a metal salt of either acid may be blended with an acid of the other, and the resulting blend reacted with additional metal base.

Suitable metal bases for the preparation of the mixed-acid metal salts include the oxides, hydroxides, alkoxides and other basic salts of the metals previously enumerated, and in some cases the free metals themselves. Examples are sodium hydroxide, potassium hydroxide, magnesium oxide, calcium hydroxide, zinc oxide, lead oxide, nickel oxide and the like.

The temperature at which the mixed-acid metal salts are prepared is generally between about 30° C. and about 150° C., preferably up to about 125° C. If the mixed-acid salts are prepared by neutralization of a mixture of acids with a metal base, it is preferred to employ temperatures above about 50° C. and especially above about 75° C. It is frequently advantageous to conduct the reaction in the presence of a substantially inert, normally liquid organic diluent such as naphtha, benzene, xylene, mineral oil and the like. If the diluent is mineral oil, it frequently need not be removed before using the mixed-acid metal salt as an additive for lubricants or functional fluids.

U.S. Pat. Nos. 4,308,154 and 4,417,970 describe procedures for preparing these mixed-acid metal salts and disclose a number of examples of such mixed salts. Such disclosures of these patents are hereby incorporated by reference.

Metal hydrocarbyl dithiocarbamates constitute another type of oil-soluble metal salts which can be used in the compositions of this invention. These are salts of one or more dithiocarbamic acids of the formula RR'N-CSSH wherein R and R' are each independently hydrocarbyl groups in which the total number of carbon atoms in R and R' is sufficient to render the metal salt oil-soluble. R and R' taken together may represent a polymethylene or alkyl substituted polymethylene group thereby forming a cyclic compound with the nitrogen atom (i.e., a monocyclic hydrocarbyl dithiocarbamate). Generally the hydrocarbyl groups will each contain at least two carbon atoms and may contain 50 or more carbon atoms. The metal component present in the dihydrocarbyl (or monocyclic hydrocarbyl) dithiocarbamate salts may be a monovalent metal or a polyvalent metal, although polyvalent metals are preferred as the salts of the polyvalent metals tend to possess better solubility in oils of lubricating viscosity. Thus although the alkali metal monocyclic hydrocarbyl or dihydrocarbyl dithiocarbamates may be used if oil-soluble, the preferred salts include, for example, salts of one or more of the alkaline earth metals, zinc, cadmium, magnesium, tin, molybdenum, iron, copper, nickel, cobalt, chromium, lead, etc. The Group II metal dihydrocarbyl dithiocarbamates are preferred.

In selecting a metal salt of a dithiocarbamic acid to be used in the compositions of this invention, R, R', and the metal may be varied so long as the metal salt is adequately oil-soluble. The nature and type of the mineral base stock, and the type of service contemplated for the treated lubricating oil should be taken into consideration in the choice of metal salt.

The metal constituent of the metal dihydrocarbyl dithiocarbamate is usually a simple metal cation. However in the case of certain polyvalent metal derivatives such as the tin and lead compounds, the metal constituent itself may be hydrocarbyl substituted (e.g., (RR'N-CSS-)$_x$MR$_1$R$_2$, where M is a polyvalent metal, R, R', R$_1$ and R$_2$ are, independently, hydrocarbyl groups (and, optionally R and R' taken together are a single cyclic hydrocarbyl group) in which the total number of carbon atoms is sufficient to render the compound oil-soluble, and x is an integer sufficient to satisfy the remaining valence(s) of M. Techniques described for example in U.S. Pat. No. 2,786,814, the disclosure of which is incorporated herein by reference, may be employed for preparing such hydrocarbyl-substituted metal dithiocarbamates.

Mixtures of metal salts of dithiocarbamic acids also are contemplated as being useful in the present invention. Such mixtures can be prepared by first preparing mixtures of dithiocarbamic acids and thereafter converting said acid mixtures to metal salts, or alternatively, metal salts of various dithiocarbamic acids can be prepared and thereafter mixed to give the desired product. Thus, the mixtures which can be incorporated in the compositions of the invention may be merely the physical mixture of the different metallic dithiocarbamic compounds, or compounds having different dithiocarbamate groupings attached to the same polyvalent metal atoms.

Examples of alkyl groups are ethyl, propyl, butyl, amyl, hexyl, heptyl, octyl, decyl, dodecyl, tridecyl, pentadecyl and hexadecyl groups including isomeric forms thereof. Examples of cycloalkyl groups include cyclohexyl and cycloheptyl groups, and examples of aralkyl groups include benzyl and phenethyl. Examples of polymethylene groups include penta- and hexamethylene groups, and examples of alkyl-substituted polymethylene groups include methyl pentamethylene, dimethyl pentamethylene, etc.

Specific examples of the metal dithiocarbamates useful in the compositions of this invention include zinc dibutyldithiocarbamate, zinc diamyldithiocarbamate, zinc di(2-ethylhexyl)dithiocarbamate, cadmium dibutyldithiocarbamate, cadmium dioctyldithiocarbamate, cadmium octylbutyldithiocarbamate, magnesium dibutyldithiocarbamate, magnesium dioctyldithiocarbamate, cadmium dicetyldithiocarbamate, copper diamyldithiocarbamate, sodium dioctadecyldithiocarbamate, lead dioctyldithiocarbamate, nickel diheptyldithiocarbamate, calcium di-2-ethylhexyldithiocarbamate, etc.

The various metal salts of dithiocarbamic acids utilized in the compositions of this invention are well known in the art and can be prepared by known techniques. See for example Ullmann, *Encyklopadie der technischen Chemie*, Band 10, Verlag Chemie, Weinheim, copyright 1975, pages 167–170 (and references cited therein); Thorn and Ludwig, *The Dithiocarbamates and Related Compounds*, Elsevier Publishing Company, 1962, pages 12 to 37 (and references cited therein); Delepine, *Compt. Rend.*, 144, 1125 (1907); Whitby et al, *Proceedings and Transactions of The Royal Society of Canada, XVIII*, 111–114 (1924) (and references cited therein), Chabrier et al, *Bulletin de la Societe Chimique De France*, 1950, pages 43 et seq. (and references cited therein), and U.S. Pat. Nos. 1,622,534; 1,921,091; 2,046,875; 2,046,876; 2,258,847; 2,406,960; 2,443,160; 2,450,633; 2,492,314; 2,580,274; 3,513,094; 3,630,897; 4,178,258; and 4,226,733. The disclosures of each of the documents referred to in this paragraph are incorporated herein by reference.

While boron is not a metallic element, boron tris (dihydrocarbyl dithiocarbamates) can be used in the compositions of this invention, either individually or in combination with one or more metal dihydrocarbyl dithiocarbamates. Methods suitable for the production of such boron dithiocarbamates are set forth in U.S. Pat. No. 4,879,071, the disclosure of which is incorporated herein.

Derivatives of metal dihydrocarbyl dithiocarbamates may be used in addition to or in lieu of the metal dihydrocarbyl dithiocarbamates. Such derivatives include dithiocarbamate-derived phosphates such as are described in U.S. Pat. No. 4,919,830, reaction products of N,N-diorganodithiocarbamates with thionyl chloride such as are described in U.S. Pat. No. 4,867,893, N,N-diorganodithiocarbamate-alkylthiosulfinyl halide reaction products such as are described in U.S. Pat. No. 4,859,356, reaction products of halogenated EPDM terpolymers and alkali metal dialkyldithiocarbamate such as are described in U.S. Pat. No. 4,502,972, and sulfurized metal dihydrocarbyl dithiocarbamates such as are described in U.S. Pat. No. 4,360,438, among others. In addition, the metal dihydrocarbyl dithiocarbamates may be used in combination with other carbamate compounds such as for example, a 1,2-dicarbethoxyethyl dialkyldithiocarbamate such as is disclosed in U.S. Pat. No. 4,479,883; or a mercaptoalkanoic acid dithiocarbamate of the type described in U.S. Pat. No. 3,890,363. The disclosures of each of the patents referred to in this paragraph are incorporated herein by reference.

Metal-containing detergents can be employed in the compositions of this invention. These components are exemplified by oil-soluble or oil-dispersible basic salts of alkali or alkaline earth metals with one or more of the following acidic substances (or mixtures thereof): (1) sulfonic acids, (2) carboxylic acids, (3) salicylic acids, (4) alkylphenols, (5) sulfurized alkylphenols, (6) organic phosphorus acids characterized by at least one direct carbon-to-phosphorus linkage. Such organic phosphorus acids include those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The salts for use in this embodiment are preferably basic salts having a TBN of at least 50, preferably above 100, and most preferably above 200. In this connection, TBN is determined in accordance with ASTM D-2896-88.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C., and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve alcohol, Carbitol alcohol, ethylene glycol, stearyl alcohol, and cyclohexyl alcohol; and amines such as aniline, phenylenediamine, phenothiazine, phenylbetanaphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60° to 200° C.

Examples of suitable metal-containing detergents include, but are not limited to, the basic or overbased salts of such substances as lithium phenates, sodium phenates, potassium phenates, calcium phenates, magnesium phenates, sulfurized lithium phenates, sulfurized sodium phenates, sulfurized potassium phenates, sulfurized calcium phenates, and sulfurized magnesium phenates wherein each aromatic group has one or more aliphatic groups to impart hydrocarbon solubility; lithium sulfonates, sodium sulfonates, potassium sulfonates, calcium sulfonates, and magnesium sulfonates wherein each sulfonic acid moiety is attached to an aromatic nucleus which in turn usually contains one or more aliphatic substituents to impart hydrocarbon solubility; lithium salicylates, sodium salicylates, potassium salicylates, calcium salicylates, and magnesium salicylates wherein the aromatic moiety is usually substituted by one or more aliphatic substituents to impart hydrocarbon solubility; the lithium, sodium, potassium, calcium and magnesium salts of hydrolyzed phosphosulfurized olefins having 10 to 2,000 carbon atoms or of hydrolyzed phosphosulfurized alcohols and/or aliphatic-substituted phenolic compounds having 10 to 2,000 carbon atoms; lithium, sodium, potassium, calcium and magnesium salts of aliphatic carboxylic acids and aliphatic-substituted cycloaliphatic carboxylic acids; and many other similar alkali and alkaline earth metal salts of oil-soluble organic acids. Mixtures of basic or overbased salts of two or more different alkali and/or alkaline earth metals can be used. Likewise, basic or overbased salts of mixtures of two or more different acids or two or more different types of acids (e.g., one or more calcium phenates with one or more calcium sulfonates) can also be used. While rubidium, cesium and strontium salts are feasible, their expense renders them impractical for most uses. Likewise, while barium salts are effective, the status of barium as a heavy metal under a toxicological cloud renders barium salts less preferred for present-day usage.

As is well known, overbased metal detergents are generally regarded as containing overbasing quantities of inorganic bases, probably in the form of micro dispersions or colloidal suspensions. Thus the terms "oil-soluble" and "oil-dispersible" are applied to these metal-containing detergents so as to include metal detergents wherein inorganic bases are present that are not necessarily completely or truly oil-soluble in the strict sense of the term, inasmuch as such detergents when mixed into base oils behave in much the same way as if they were fully and totally dissolved in the oil.

Collectively, the various basic or overbased detergents referred to hereinabove, have sometimes been called, quite simply, basic alkali metal or alkaline earth metal-containing organic acid salts.

Methods for the production of oil-soluble basic and overbased alkali and alkaline earth metal-containing detergents are well known to those skilled in the art and are extensively reported in the patent literature. See for example, the disclosures of U.S. Pat. Nos. 2,451,345; 2,451,346; 2,485,861; 2,501,731; 2,501,732; 2,585,520; 2,671,758; 2,616,904; 2,616,905; 2,616,906; 2,616,911; 2,616,924; 2,616,925; 2,617,049; 2,695,910; 3,178,368; 3,367,867; 3,496,105; 3,629,109; 3,865,737; 3,907,691; 4,100,085; 4,129,589; 4,137,184; 4,148,740; 4,212,752; 4,617,135; 4,647,387; 4,880,550; GB Published Patent Application 2,082,619 A, and European Patent Publication Nos. 121,024 B1 and 259,974 A2.

For certain applications, the compositions can contain metal-free sulfur-containing antiwear and/or extreme pressure agents. Examples are included within the categories of dihydrocarbyl polysulfides; sulfurized olefins; sulfurized fatty acid esters of both natural and synthetic origins; trithiones; sulfurized thienyl derivatives; sulfurized terpenes; sulfurized oligomers of $C_2$–$C_8$ monoolefins; and sulfurized Diels-Alder adducts such as those disclosed in U.S. reissue patent Re 27,331. Specific examples include sulfurized polyisobutene of $\overline{M}n$ 1,100, sulfurized isobutylene, sulfurized diisobutylene, sulfurized triisobutylene, dicyclohexyl polysulfide, diphenyl polysulfide, dibenzyl polysulfide, dinonyl polysulfide, and mixtures of di-tert-butyl polysulfide such as mixtures of di-tert-butyl trisulfide, di-tert-butyl tetrasulfide and di-tert-butyl pentasulfide, among others. Combinations of such categories of sulfur-containing antiwear and/or extreme pressure agents can also be used, such as a combination of sulfurized isobutylene and di-tert-butyl trisulfide, a combination of sulfurized isobutylene and dinonyl trisulfide, a combination of sulfurized tall oil and dibenzyl polysulfide, and the like.

The most preferred oil-soluble metal-free sulfur-containing antiwear and/or extreme pressure agents from the cost-effectiveness standpoint are the sulfurized olefins containing at least 30% by weight of sulfur, the dihydrocarbyl polysulfides containing at least 25% by weight of sulfur, and mixtures of such sulfurized olefins and polysulfides. Of these materials, sulfurized isobutylene having a sulfur content of at least 40% by weight and a chlorine content of less than 0.2% by weight is the most especially preferred material. Methods of preparing sulfurized olefins are described in U.S. Pat. Nos. 2,995,569; 3,673,090; 3,703,504; 3,703,505; 3,796,661; and 3,873,454. Also useful are the sulfurized olefin derivatives described in U.S. Pat. No. 4,654,156.

Other types of antiwear and/or extreme pressure additives that can be used in the compositions of this invention include, for example, esters of boron acids, esters of phosphorus acids, amine salts of phosphorus acids and acid esters, higher carboxylic acids and derivatives thereof, chlorine-containing additives, and the like.

Esters of boron acids which may be used include borate, metaborate, pyroborate and biborate esters of monohydric and/or polyhydric alcohols and/or phenols, such as trioctyl borate, tridecyl borate, 2-ethylhexyl pyroborate, isoamyl metaborate, trixylyl borate, (butyl)(2,4-hexanediyl)borate, and the like.

Typical esters of phosphorus acids which may be used as antiwear and/or extreme pressure additives include trihydrocarbyl phosphites, phosphonates and phosphates, and dihydrocarbyl phosphites; such as tricresyl phosphate, tributyl phosphite, tris(2-chloroethyl)phosphate and phosphite, dibutyl trichloromethyl phosphonates, di(n-butyl)phosphite, triphenyl phosphite, and tolyl phosphinic acid dipropyl ester.

Among the amine salts of phosphorus acids and phosphorus acid-esters which can be employed are amine salts of partially esterified phosphoric, phosphorous, phosphonic, and phosphinic acids and their partial or total thio analogs such as partially esterified monothiophosphoric, dithiophosphoric, trithiophosphoric and tetrathiophosphoric acids; amine salts of phosphonic acids and their thio analogs; and the like. Specific examples include the dihexylammonium salt of dodecylphosphoric acid, the diethyl hexyl ammonium salt of dioctyl dithiophosphoric acid, the octadecylammonium salt of dibutyl thiophosphoric acid, the dilaurylammonium salt of 2-ethylhexylphosphoric acid, the dioleyl ammonium salt of butane phosphonic acid, and analogous compounds.

Higher carboxylic acids and derivatives which can be used as antiwear and/or extreme pressure additives are illustrated by fatty acids, dimerized and trimerized unsaturated natural acids (e.g., linoleic) and esters, amine, ammonia, and metal (particularly lead) salts thereof, and amides and imidazoline salt and condensation products thereof, oxazolines, and esters of fatty acids, such as ammonium di-(linoleic) acid, lard oil, oleic acid, animal glycerides, lead stearate, etc.

Suitable chlorine-containing additives include chlorinated waxes of both the paraffinic and microcrystalline type, polyhaloaromatics such as di- and trichlorobenzene, trifluoromethyl naphthalenes, perchlorobenzene, pentachlorophenol and dichloro diphenyl trichloroethane. Also useful are chlorosulfurized olefins and olefinic waxes and sulfurized chlorophenyl methyl chlorides and chloroxanthates. Specific examples include chlorodibenzyl disulfide, chlorosulfurized polyisobutene of $\overline{M}n$ 600, chlorosulfurized pinene and chlorosulfurized lard oil.

Seal performance improvers (elastomer compatibility additives) can be used in the compositions of this invention. Known materials of this type include dialkyl diesters such as dioctyl sebacate, aromatic hydrocarbons of suitable viscosity such as Panasol AN-3N, products such as Lubrizol 730, polyol esters such as Emery 2935, 2936, and 2939 esters from the Emery Group of Henkel Corporation and Hatcol 2352, 2962, 2925, 2938, 2939, 2970, 3178, and 4322 polyol esters from Hatco Corporation. Generally speaking the most suitable diesters include the adipates, azelates, and sebacates of $C_8$–$C_{13}$ alkanols (or mixtures thereof), and the phthalates of $C_4$–$C_{13}$ alkanols (or mixtures thereof). Mixtures of two or more different types of diesters (e.g., dialkyl adipates and dialkyl azelates, etc.) can also be used. Examples of such materials include the n-octyl, 2-ethylhexyl, isodecyl, and tridecyl diesters of adipic acid, azelaic acid, and sebacic acid, and the n-butyl, isobutyl, pentyl, hexyl, heptyl, octyl, nonyl, decyl, undecyl, dodecyl, and tridecyl diesters of phthalic acid.

Antioxidants can be used, such as one or more phenolic anti-oxidants, aromatic amine antioxidants, sulphurized phenolic anti-oxidants, and organic phosphites, among others. Examples include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenyl amine, phenyl-e-naphthyl amine, and phenyl-β-naphthyl amine.

Corrosion inhibitors comprise another type of optional additive for use in this invention. Thus use can be made of dimer and trimer acids, such as are produced from tall oil fatty acids, oleic acid, linoleic acid, or the like. Products of this type are currently available from various commercial sources, such as, for example, the dimer and trimer acids sold under the HYSTRENE trademark by the Humco Chemical Division of Witco Chemical Corporation and under the EMPOL trademark by Emery Chemicals. Another useful type of corrosion inhibitor for use in the practice of this invention are the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof, and the like. Materials of these types are well known to those skilled in the art and a number of such materials are available as articles of commerce.

Foam inhibitors are likewise suitable for use as optional components in the compositions of this invention. These include silicones, polyacrylates, surfactants, and the like. Various antifoam agents are described in *Foam Control Agents* by H. T. Kerner (Noyes Data Corporation, 1976, pages 125–176), the disclosure of which is incorporated herein by reference. Mixtures of silicone-type antifoam agents such as the liquid dialkyl silicone polymers with various other substances are also effective. Typical of such mixtures are silicones mixed with an acrylate polymer, silicones mixed with one or more amines, and silicones mixed with one or more amine carboxylates.

Copper corrosion inhibitors constitute another class of additives suitable for inclusion in the compositions of this invention. Such compounds include thiazoles, triazoles and thiadiazoles. Examples of such compounds include benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles. The preferred compounds are the 1,3,4-thiadiazoles, a number of which are available as articles of commerce.

The compositions of this invention may also contain friction modifiers such as aliphatic amines or ethoxylated aliphatic amines, aliphatic fatty acid amides, aliphatic carboxylic acids, aliphatic carboxylic esters, aliphatic carboxylic esteramides, aliphatic phosphonates, aliphatic phosphates, aliphatic thiophosphonates, aliphatic thiophosphates, etc., wherein the aliphatic group usually contains above about eight carbon atoms so as to render the compound suitably oil soluble. Also suitable are aliphatic substituted succinimides formed by reacting one or more aliphatic succinic acids or anhydrides with ammonia.

Still other components useful in the compositions of this invention are lubricity agents such as sulfurized fats, sulfurized isobutylene, dialkyl polysulfides, and sulfur-bridged phenols such as nonylphenol polysulfide. Air release agents, pour point depressants, demulsifiers, dyes, and the like can also be included in the compositions of this invention.

In selecting any of the foregoing optional additives, it is of course important to ensure that the selected component(s) are soluble in the oleaginous liquid, are compatible with the other components of the composition, and do not interfere significantly with the low temperature viscosity properties desired in the overall finished oleaginous composition.

These additives can of course be blended into the compositions of this invention individually or in various sub-combinations. However it is usually preferable to introduce the additives into the composition in the form of an additive concentrate (sometimes variously referred to as ad-packs, or DI packs), as this minimizes blending errors, simplifies blending procedures and takes advantage of the compatibility and mutual solubility characteristics of the additive concentrate.

Typical additive concentrates which may be used in the compositions of this invention are set forth in Examples A through K below. It will be understood and appreciated that these additive concentrates are presented for purposes of illustration only, and are not intended to constitute, and should not be construed as constituting, limitations on the scope of this invention.

EXAMPLE A

A concentrate ("DI-pack") is formed from the following components:

| 67.56% | Phosphorus- and boron-containing ashless dispersant[1]; |
|---|---|
| 2.69% | Ethoxylated amines[2]; |
| 0.72% | Tolyltriazole (Cobratec TT-100); |
| 1.06% | Silicone antifoam agent (4% solution in hydrocarbon); |
| 4.66% | Bis-(p-nonylphenyl)amine (Naugalube 438L); |
| 0.90% | Calcium phenate[3]; |
| 0.90% | Octanoic acid; |
| 8.60% | Sulfurized fat[4] |
| 12.91% | Mineral oil diluent. |

[1]Prepared as in Example 1A of U.S. Pat. No. 4,857,214, and this component contains approximately 25% mineral oil diluent.
[2]A combination of 2.24% Ethomeen T-12 (Akzo Chemical, Inc.) and 0.45% Tomah PA-14 (Exxon Chemical Company).
[3]OLOA 216C (Chevron Chemical Company).
[4]Sulperm 10S (Keil Products Division of Ferro Corporation).

EXAMPLE B

A concentrate is formed from the following components:

| 67.56% | Phosphorus- and boron-containing ashless dispersant[1]; |
|---|---|
| 2.95% | Ethoxylated amine[2]; |
| 0.72% | 2-(dodecyldithio)-5-mercapto-1,3,4-thiadiazole; |
| 1.06% | Silicone antifoam agent (4% solution in hydrocarbon); |
| 4.66% | Bis-(p-nonylphenyl)amine (Naugalube 438L); |
| 1.80% | Surfactant[3]; |
| 0.90% | Calcium phenate[4]; |
| 0.90% | Octanoic acid; |
| 19.45% | Mineral oil diluent. |

[1]Prepared as in Example 1A of U.S. Pat. No. 4,857,214, and this component contains approximately 25% mineral oil diluent.
[2]Ethomeen T-12.
[3]Pluronic L-81.
[4]OLOA 225.

EXAMPLE C

A concentrate is formed from the following components:

| 67.56% | Phosphorus- and boron-containing ashless dispersant[1]; |
|---|---|
| 2.69% | Ethoxylated amine[2]; |
| 0.72% | Benzotriazole (Cobratec 99); |
| 1.06% | Silicone antifoam agent (4% solution in hydrocarbon); |
| 4.66% | Bis-(p-nonylphenyl)amine (Naugalube 438L); |
| 1.62% | Surfactants[3]; |
| 1.05% | Octanoic acid; |
| 4.45% | Sulfurized fat[4]; |
| 16.19% | Mineral oil diluent. |

[1]Prepared as in Example 1A of U.S. Pat. No. 4,857,214, and this component contains approximately 25% mineral oil diluent.
[2]Tomah PA-14.
[3]A combination of 1.14% PC 1244 and 0.48% Pluronic L-81.
[4]Sulperm 10S.

EXAMPLE D

A concentrate is formed from the following components:

| 67.56% | Phosphorus- and boron-containing ashless dispersant[1]; |
|---|---|
| 3.44% | Ethoxylated amines[2]; |
| 0.72% | 2,5-di-(methylthio)-1,3,4-thiadiazole; |
| 1.06% | Silicone antifoam agent (4% solution in hydrocarbon); |
| 4.66% | Ethyl antioxidant 728 (Ethyl Corporation); |
| 1.48% | Surfactant[3]; |
| 0.90% | Calcium phenate[4]; |
| 0.90% | Octanoic acid; |
| 2.75% | Sulfurized isobutylene; |
| 16.53% | Mineral oil diluent. |

[1]Prepared as in Example 1A of U.S. Pat. No. 4,857,214, and this component contains approximately 25% mineral oil diluent.
[2]A combination of 1.88% Ethomeen T-12 and 1.56% Tomah PA-14.
[3]Mazawet 77.
[4]OLOA 218A.

EXAMPLE E

A concentrate is formed from the following components:

| 67.56% | Phosphorus- and boron-containing ashless dispersant[1]; |
|---|---|
| 2.69% | Ethoxylated amines[2]; |
| 0.72% | 2-(dodecyldithio)-5-mercapto-1,3,4-thiadiazole; |
| 1.06% | Silicone antifoam agent (4% solution in hydrocarbon); |
| 4.66% | Bis-(p-nonylphenyl)amine (Naugalube 438L); |
| 1.62% | Surfactants[3]; |
| 0.90% | Calcium phenate[4]; |
| 0.90% | Octanoic acid; |
| 8.60% | Sulfurized fat[5]; |
| 11.29% | Mineral oil diluent. |

[1]Prepared as in Example 1A of U.S. Pat. No. 4,857,214, and this component contains approximately 25% mineral oil diluent.
[2]A combination of 1.79% Ethomeen T-12 and 0.90% Tomah PA-1.
[3]A combination of 0.54% PC 1244, 0.90% Mazawet 77, and 0.18% Pluronic L-81.
[4]OLOA 216C.
[5]Sulperm 10S.

EXAMPLE F

A concentrate is formed from the following components:

| 67.56% | Phosphorus- and boron-containing ashless dispersant[1]; |
|---|---|
| 2.95% | Ethoxylated amines[2]; |
| 0.72% | 2-(dodecyldithio)-5-mercapto-1,3,4-thiadiazole; |
| 1.06% | Silicone antifoam agent (4% solution in hydrocarbon); |
| 4.66% | Bis-(p-nonylphenyl)amine (Naugalube 438L); |
| 1.85% | Surfactant[3]; |
| 0.90% | Calcium phenate[4]; |
| 0.90% | Octanoic acid; |
| 7.42% | Sulfurized fat[5]; |
| 11.98% | Mineral oil diluent. |

[1]Prepared as in Example IA of U.S. Pat. No. 4,857,214, and this component contains approximately 25% mineral oil diluent.
[2]A combination of 1.79% Ethomeen T-12 and 0.90% Tomah PA-14.
[3]PC 1244.
[4]OLOA 218A.
[5]Sulperm 60–93 (Keil Products Division of Ferro Corporation).

EXAMPLE G

A concentrate is formed from the following components:

| | |
|---|---|
| 67.56% | Phosphorus- and boron-containing ashless dispersant[1]; |
| 2.35% | Ethoxylated amines[2]; |
| 0.70% | Tolyltriazole; |
| 1.06% | Silicone antifoam agent (4% solution in hydrocarbon); |
| 8.65% | Ethyl antioxidant 728 OM50 (Ethyl Corporation); |
| 1.58% | Surfactants[3]; |
| 0.90% | Calcium phenate[4]; |
| 0.90% | Octanoic acid; |
| 4.42% | Sulfurized fat[5]; |
| 11.88% | Mineral oil diluent. |

[1] Prepared as in Example 1A of U.S. Pat. No. 4,857,214, and this component contains approximately 25% mineral oil diluent.
[2] A combination of 1.40% Ethomeen T-12 and 0.95% Tomah PA-14.
[3] A combination of 0.95% PC 1244 and 0.63% Mazawet 77.
[4] OLOA 216C.
[5] Sulperm 60–93.

EXAMPLE H

A concentrate is formed from the following components:

| | |
|---|---|
| 67.57% | Phosphorus- and boron-containing ashless dispersant[1]; |
| 1.79% | Ethoxylated amine[2]; |
| 0.72% | 2-(dodecyldithio)-5-mercapto-1,3,4-thiadiazole; |
| 1.08% | Silicone antifoam agent (4% solution in hydrocarbon); |
| 4.66% | Bis-(p-nonyiphenyl)amine (Naugalube 438L); |
| 1.98% | Surfactants[3]; |
| 0.90% | Calcium phenate[4]; |
| 0.90% | Octanoic acid; |
| 0.54% | M-544 (Monsanto Company); |
| 8.60% | Sulfurized fat[5]; |
| 11.26% | Mineral oil diluent (45N) |

[1] Prepared as in Example 1A of U.S. Pat. No. 4,857,214, and this component contains approximately 25% mineral oil diluent.
[2] Ethomeen T-12.
[3] A combination of 0.90% Tomah PA-14, 0.90% Mazawet 77, and 0.18% Pluronic L-81.
[4] OLOA 216C.
[5] Sulperm 10S

EXAMPLE I

A concentrate is formed from the components used in the production of Paranox 445 additive (Exxon Chemical Company) except that all or substantially all of any polymeric viscosity index improver that is not a vinylaromatic-maleic ester viscosity index improver (and any diluent employed in conjunction with such non-vinylaromatic-maleic ester viscosity index improver) employed in Paranox 445 additive is eliminated. By "substantially all" in this and ensuing examples is meant that any amount of non-vinylaromatic-maleic ester viscosity index improver that is present in the commercial additive concentrate does not destroy the low temperature viscometrics afforded by this invention. More specifically, the addition at a suitable treat level of an additive concentrate containing a non-vinylaromatic-maleic ester viscosity index improver to an oleaginous composition of this invention should not convert the oleaginous composition from one which has a Brookfield viscosity of 20,000 cP or less at −40° C. when devoid of the concentrate to an oleaginous composition that has a Brookfield viscosity above 20,000 cP at −40° C. when the concentrate has been dissolved therein.

EXAMPLE J

A concentrate is formed from the components used in the production of Lubrizol® LZ-6715D additive (The Lubrizol Corporation) except that all or substantially all of any polymeric viscosity index improver that is not a vinylaromatic-maleic ester viscosity index improver (and any diluent employed in conjunction with such non-vinylaromatic-maleic ester viscosity index improver) employed in Lubrizol® LZ-6715D additive is eliminated.

EXAMPLE K

Seven concentrates are formed from the components used in the production of the following seven commercial products of The Lubrizol Corporation: Lubrizol® LZ-6704 additive, Lubrizol® LZ-7900 additive, Lubrizol® LZ-7901 additive, Lubrizol® LZ-7907 additive, Lubrizol® LZ-7925 additive, Lubrizol® LZ-7993 additive, and Lubrizol® LZ-7993A additive. In each case all or substantially all of any polymeric viscosity index improver that is not a vinylaromatic-maleic ester viscosity index improver (and any diluent employed in conjunction with such non-vinylaromatic-maleic ester viscosity index improver) employed in the particular commercial product of Lubrizol is eliminated.

EXAMPLE L

Four concentrates are formed from the components used in the production of the following four commercial products of Exxon Chemical Company: Paramins ECA 9172 additive, Paramins ECA 11998 additive, Paranox 440 additive, and Paranox 442 additive. In each case all or substantially all of any polymeric viscosity index improver that is not a vinylaromatic-maleic ester viscosity index improver (and any diluent employed in conjunction with such non-vinylaromatic-maleic ester viscosity index improver) employed in the particular commercial product of Exxon Chemical Company is eliminated.

Proportions of Additives

In general, the additive components used in the compositions of this invention are employed in minor amounts sufficient to improve the performance characteristics and properties of the base fluid. The amounts will thus vary in accordance with such factors as the severity and type of service for which the composition is intended, the performance characteristics desired in the finished composition, the makeup of the particular base oil composition, the identity of the additives being used, and other similar considerations. However, generally speaking, the following concentrations (weight percent) of the components (active ingredients) in the base fluids are illustrative:

| | Typical Range | Preferred Range |
|---|---|---|
| Dispersant | 0–20 | 0.1–8 |
| Antiwear Agent | 0–6 | 0.001–4 |
| Detergent/Rust Inhibitor | 0–20 | 0.1–5 |
| Antioxidant | 0–5 | 0.1–3 |
| Corrosion inhibitor | 0–5 | 0.005–3 |
| Seal performance improver | 0–30 | 1–20 |
| Foam inhibitor | 0–1 | 0.001–0.5 |
| Copper corrosion inhibitor | 0–5 | 0.01–2 |
| Friction modifier | 0–5 | 0.01–2 |
| Pour Point Depressant | 0–3 | 0–1 |
| Dye | 0–0.05 | 0–0.035 |

It is to be noted that some additives are multifunctional additives capable of contributing more than a single property to the blend in which they are used. Thus when employing a multifunctional additive component in the compositions of this invention, the amount used should of course be sufficient to achieve the function(s) and result(s) desired therefrom.

For some applications the finished oleaginous lubricant or functional fluid compositions of this invention are provided in ashless or low-ash form, i.e., the compositions in these cases either contain no added metal-containing additive (and thus are "ashless") or they contain at most 100 ppm of metal in the form of metal-containing additive(s). In this connection, boron, phosphorus and certain other non-metallic elements may form ash-like residues on parts exposed to extremely high temperatures or combustion processes. However such non-metallic additives are classified as "ashless" additives and thus can be present in any suitable amounts without detracting from the ashless or low-ash characterization of the composition.

Performance

In order to illustrate the excellent performance achievable by the practice of this invention, low temperature viscosity tests were carried out in which determinations of Brookfield viscosities at −40° C. were made in accordance with ASTM test method D 2983. The compositions tested and the results in terms of Brookfield viscosities at −40° C. are summarized in the following tables. In each case the additive concentrate ("DI-Pack") used was that of Example H, and the −40° Viscosity is the Brookfield viscosity as measured after maintaining the compositions in the bath at −40° C. for 16 hours.

TABLE I

| Components | Run 1; Amounts Used, wt % | Run 2; Amounts Used, wt % | Run 3; Amounts Used, wt % |
|---|---|---|---|
| a) Exxon 1365 100N oil | 89.90 | 79.90 | 84.40 |
| b) ETHYLFLO 162 PAO | None | 10.00 | 10.00 |
| c) LZ 3706 | 4.50 | 4.50 | None |
| d) DI-Pack | 5.60 | 5.60 | 5.60 |
| −40° Viscosity | 50,850 | 18,400 | 176,000 |

It will be seen from Table I that Run 2, which used a composition of this invention, had a Brookfield viscosity at −40° C. below 20,000 cP whereas the comparative compositions wherein the combination of components a), b) and c) was not employed failed to reach this required low temperature viscosity.

TABLE II

| Components | Run 4; Amounts Used, wt % | Run 5; Amounts Used, wt % | Run 6; Amounts Used, wt % |
|---|---|---|---|
| a) Exxon 1365 100N oil | 89.90 | 69.90 | 74.40 |
| b) ETHYLFLO 162 PAO | None | 20.00 | 20.00 |
| c) Example 1 | 4.50 | 4.50 | None |
| d) DI-Pack | 5.60 | 5.60 | 5.60 |
| −40° Viscosity | 46,000 | 8,730 | 26,425 |

The data in Table II demonstrate that a preferred composition of this invention (Run 5) wherein component c) was a preferred type of vinylaromatic viscosity index improver exhibited extremely good low temperature performance, whereas neither comparative composition achieved a Brookfield viscosity equal to or below the required value of 20,000 cP at −40° C.

TABLE III

| Components | Run 4; Amounts Used, wt % | Run 7; Amounts Used, wt % | Run 3; Amounts Used, wt % | Run 6; Amounts Used, wt % |
|---|---|---|---|---|
| a) Exxon 1365 100N oil | 89.90 | 79.90 | 84.40 | 74.40 |
| b) ETHYLFLO 162 PAO | None | 10.00 | 10.00 | 20.00 |
| c) Example 1 | 4.50 | 4.50 | None | None |
| d) DI-Pack | 5.60 | 5.60 | 5.60 | 5.60 |
| −40° Viscosity | 46,606 | 19,000 | 176,000 | 20,425 |

The data set forth in Table III further illustrate the synergistic results made possible by the practice of this invention. Thus, a preferred composition of this invention (Run 7) wherein component c) was a preferred type of vinylaromatic viscosity index improver had a Brookfield viscosity below the required value of 20,000 cP at −40° C. In contrast, none of the comparative compositions used in Runs 3, 4 or 6 achieved a Brookfield viscosity equal to or below 20,000 cP at −40° C.

Table IV summarizes additional test results obtained in tests performed in the same manner as in Tables I, II and III, except that the samples were maintained at −40° C. for 2 hours instead of 16 hours.

TABLE IV

| Components | Run 8; Amounts Used, wt % | Run 9; Amounts Used, wt % | Run 10; Amounts Used, wt % |
|---|---|---|---|
| a) Exxon 1365 100N oil | 89.40 | 79.40 | 84.40 |
| b) ETHYLFLO 162 PAO | None | 10.00 | 10.00 |
| c) Example 4 | 5.00 | 5.00 | None |
| d) DI-Pack | 5.60 | 5.60 | 5.60 |
| −40° Viscosity | 52,000 | 19,000 | 129,000 |

The data in Table IV again illustrate that a preferred composition of this invention (Run 9) wherein component c) was a preferred type of vinylaromatic viscosity index improver exhibited good low temperature performance, whereas none of the comparative compositions achieved a Brookfield viscosity equal to or below the required value of 20,000 cP at −40° C.

It will be readily apparent that this invention is susceptible to considerable modification in its practice. Accordingly, this invention is not intended to be limited by the specific exemplifications presented hereinabove. Rather, what is intended to be covered is within the spirit and scope of the appended claims.

I claim:

1. A vinylaromatic-maleic ester polymeric viscosity index improver in which the ester groups comprise at least a major molar proportion of primary alkyl groups falling in the range of $C_8$ to $C_{18}$ alkyl groups, about 50 to about 90 mol % of said primary alkyl groups being linear alkyl groups and the balance of said primary alkyl groups being branched chain alkyl groups, wherein at least 90 mol % of the ester groups are primary alkyl groups having 8, 10, 12, 14, 16 and 18 carbon atoms, wherein from 5 to 20 tool % of said primary alkyl groups are linear $C_8$ alkyl groups, and wherein from 10 to 50 mol % of said primary alkyl groups are 2-ethylhexyl groups.

2. A polymeric viscosity index improver of claim 1 wherein said vinylaromatic-maleic ester is a styrene-maleic ester.

3. A polymeric viscosity index improper of claim 1 wherein said vinylaromatic-maleic ester is a styrene-maleic ester.

4. A polymeric viscosity index improver of claim 1 wherein said polymeric viscosity index improver is an alternating vinylaromatic-maleic ester polymer in which at least 90 mol % of the ester groups are primary alkyl groups having a molar distribution in accordance with the following tabulation:

| Primary alkyl groups | Mol % Present |
|---|---|
| Linear $C_8$ | 5 to 20 |
| 2-Ethylhexyl $C_8$ | 10 to 50 |
| Linear $C_{10}$ | 5 to 20 |
| Linear $C_{12}$ | 10 to 40 |
| Linear $C_{14}$ | 5 to 20 |
| Linear $C_{16}$ | 3 to 15 |
| Linear $C_{18}$ | 1 to 10 | wherein the total reel percentage of the tabulated primary alkyl groups is in the range of 90 to 100 mol %.

5. A polymeric viscosity index improver of claim 4 wherein the vinylaromatic of said alternating vinylaromatic-maleic ester polymer is (i) styrene, (ii) one or more alkyl-styrenes having 9 to 15 carbon atoms per molecule, or (iii) a combination of (i) and (ii).

6. A polymeric viscosity index improver of claim 4 wherein said vinylaromatic-maleic ester is a styrene-maleic ester.

7. An additive composition consisting essentially of a polymeric viscosity index improver of claiming 1 wherein said viscosity index improver has a number average molecular weight in the range of about 10,000 to about 400,000 and a stabilizing amount of a hindered phenolic antioxidant to inhibit oxidative degradation of said viscosity index improver during exposure to air or oxygen.

8. A composition of claim 7 wherein said phenolic antioxidant is selected from the group consisting of 2,6-di-tert-butylphenol, 2,6-di-tert-butyl-p-cresol, 2,4-dimethyl-6-tert-butylphenol, and 4,4'-methylenebis(2,6-di-tert-butylphenol).

9. A composition which comprises oil of lubricating viscosity containing a viscosity index improving amount of a viscosity index improver of claim 1.

* * * * *

UNITED STATES PATENT AND TRADEMARK OFFICE
CERTIFICATE OF CORRECTION

PATENT NO. : 5,703,023
DATED : December 30, 1997
INVENTOR(S) : Sanjay Srinivasan It is certified that error appears in the above-indentified patent and that said Letters Patent is hereby corrected as shown below:

Column 33, Line 1, Change "improper" to --improver--

Signed and Sealed this

Tenth Day of March, 1998

*Attest:*

BRUCE LEHMAN

*Attesting Officer*     Commissioner of Patents and Trademarks